(12) United States Patent
Mackie et al.

(10) Patent No.: US 11,700,192 B2
(45) Date of Patent: Jul. 11, 2023

(54) APPARATUSES, METHODS, AND COMPUTER PROGRAM PRODUCTS FOR IMPROVED STRUCTURED EVENT-BASED DATA OBSERVABILITY

(71) Applicants: ATLASSIAN PTY LTD, Sydney (AU); ATLASSIAN INC, San Francisco, CA (US)

(72) Inventors: James C. Mackie, Sydney (AU); Alexander Else, Sydney (AU); Anton Polyakov, Lions Bay (CA); Andrei Beliaev, Coquitlam (CA); Francis Rangel Da Silva, Sunnyvale, CA (US)

(73) Assignees: ATLASSIAN PTY LTD, Sydney (AU); ATLASSIAN INC, San Francisco, CA (US)

( * ) Notice: Subject to any disclaimer, the term of this patent is extended or adjusted under 35 U.S.C. 154(b) by 0 days.

(21) Appl. No.: 17/363,367

(22) Filed: Jun. 30, 2021

(65) Prior Publication Data
US 2023/0006907 A1    Jan. 5, 2023

(51) Int. Cl.
*H04L 43/0876* (2022.01)
*H04L 43/16* (2022.01)
*H04L 43/0817* (2022.01)

(52) U.S. Cl.
CPC ...... *H04L 43/0876* (2013.01); *H04L 43/0817* (2013.01); *H04L 43/16* (2013.01)

(58) Field of Classification Search
CPC . H04L 43/0876; H04L 43/0817; H04L 43/16; H04L 49/55; H04N 1/00042
See application file for complete search history.

(56) References Cited

U.S. PATENT DOCUMENTS

| | | | |
|---|---|---|---|
| 10,469,309 B1* | 11/2019 | Gupta | H04L 41/22 |
| 2017/0078157 A1* | 3/2017 | Zhang | H04L 41/044 |
| 2020/0314117 A1* | 10/2020 | Nguyen | G06F 21/552 |
| 2021/0089370 A1* | 3/2021 | Dukhovny | G06F 11/301 |

* cited by examiner

*Primary Examiner* — Anh Nguyen
(74) *Attorney, Agent, or Firm* — Alston & Bird LLP

(57) ABSTRACT

Embodiments of the present disclosure provide improved data observability mechanisms. Specifically, embodiments provide for managing event-structured observability data in a federated network and database platform. The improved mechanisms enable improved analysis of data-driven errors and/or storage of associated data for purposes of data observability processing actions and/or rendering for user analysis. Example embodiments are configured for receiving a data stream representing operational engagement of an event-structured service hosted by the federated network and database platform. Some example embodiments are further configured for generating event-structured observability data from the data stream utilizing an event processing pipeline. The example embodiments are further configured for storing the event-structured observability data in at least one event-structured observability data repository of the federated network and database platform. The example embodiments are further configured for initiating an event-driven observability action based on the event-structured observability data.

18 Claims, 15 Drawing Sheets

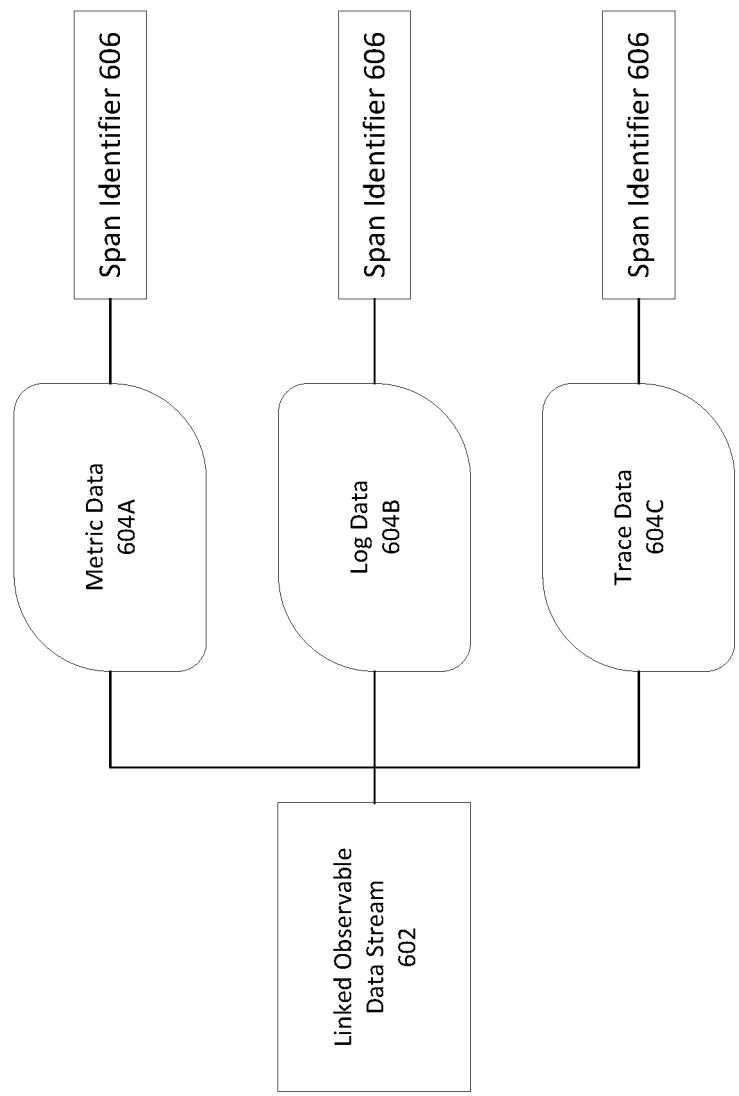

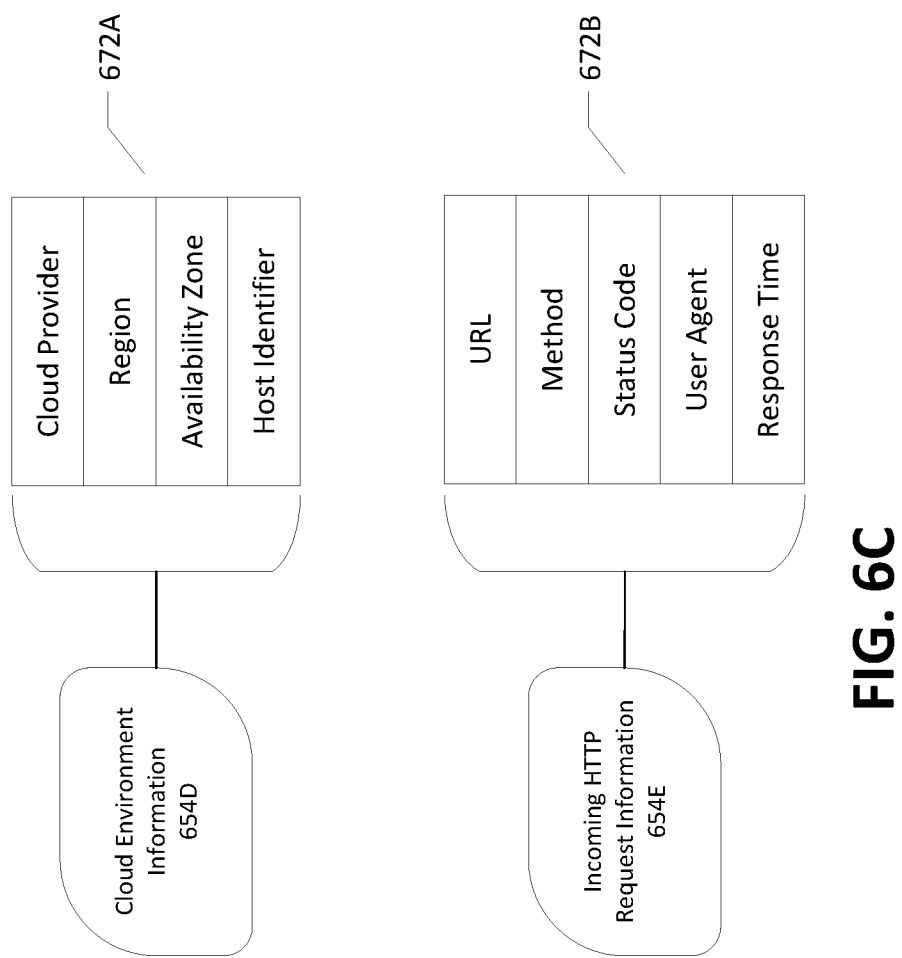

ND COMPUTER PROGRAM PRODUCTS FOR IMPROVED STRUCTURED EVENT-BASED DATA OBSERVABILITY

TECHNOLOGICAL FIELD

Embodiments of the present disclosure generally relate to data observability, and specifically to improved data observability systems for computing service(s) utilizing structured event-based observability data.

BACKGROUND

Computing services rely on data observability to ensure issues or incidents that arise can be identified and addressed appropriately. Observability systems solely relying on discrete and/or independent metrics, logs, and traces often are incomplete, constrained to limited collection of contextual data associated with performed actions, and do not effectively store collected data for a sufficient time band and manner in order to maintain operational efficiency in providing data observability. Applicant has discovered problems with current implementations and systems configured for data observability. Through applied effort, ingenuity, and innovation, Applicant has solved many of these identified problems by developing embodied in the present disclosure, which are described in detail below.

BRIEF SUMMARY

The appended claims herein serve as a summary of the disclosure.

BRIEF DESCRIPTION OF THE DRAWINGS

Figure 1:
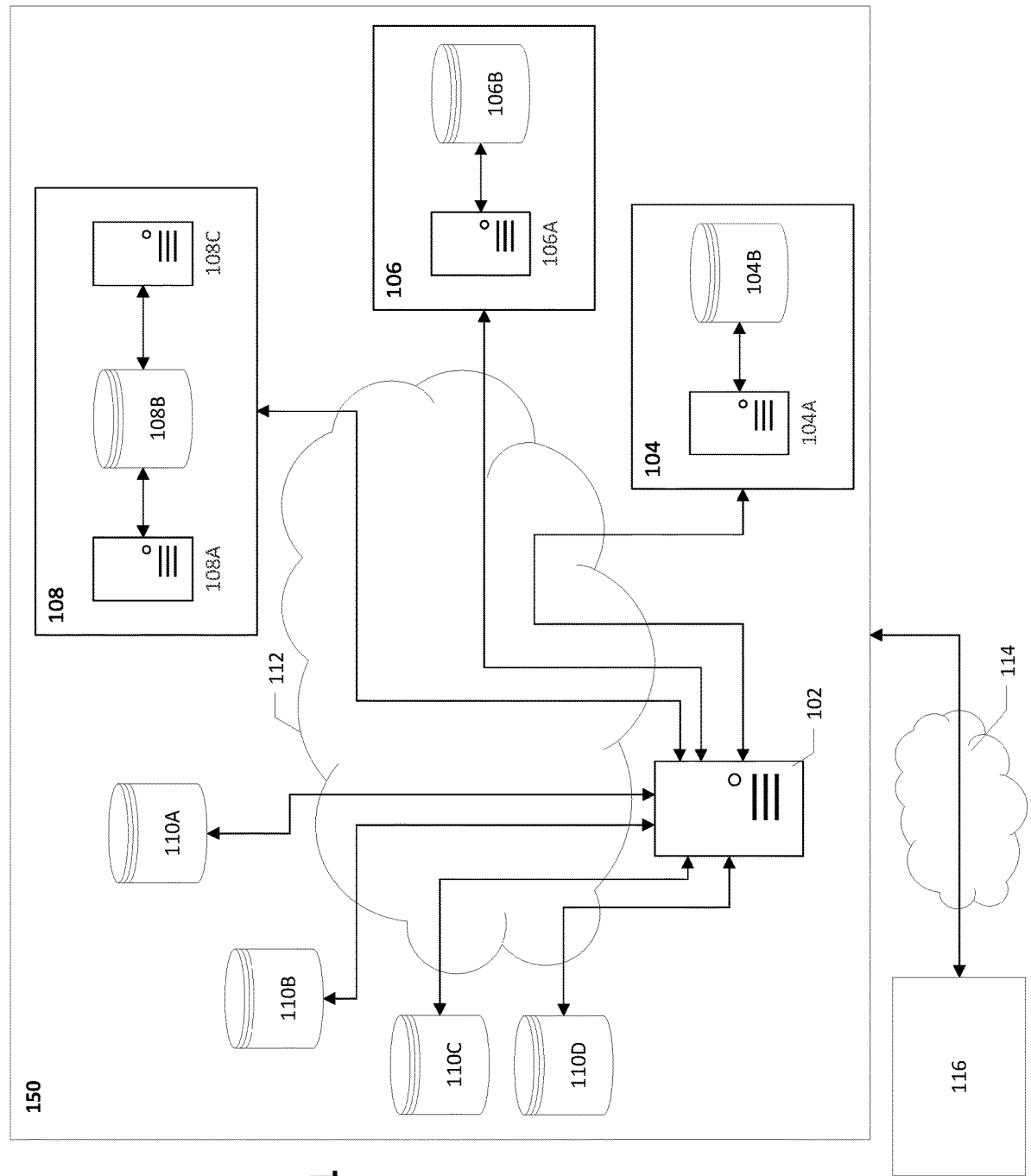
Figure 2A:
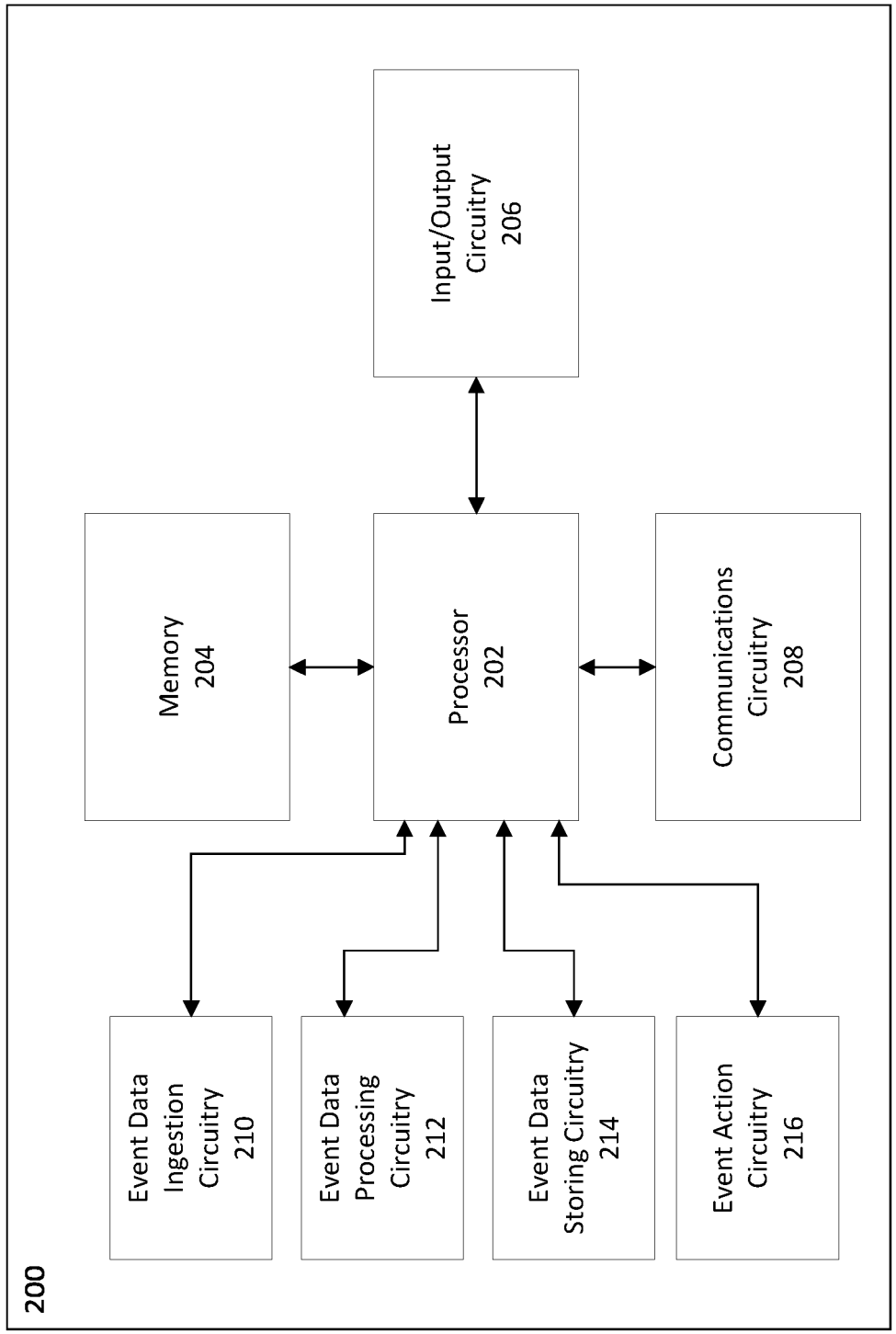
Figure 2B:
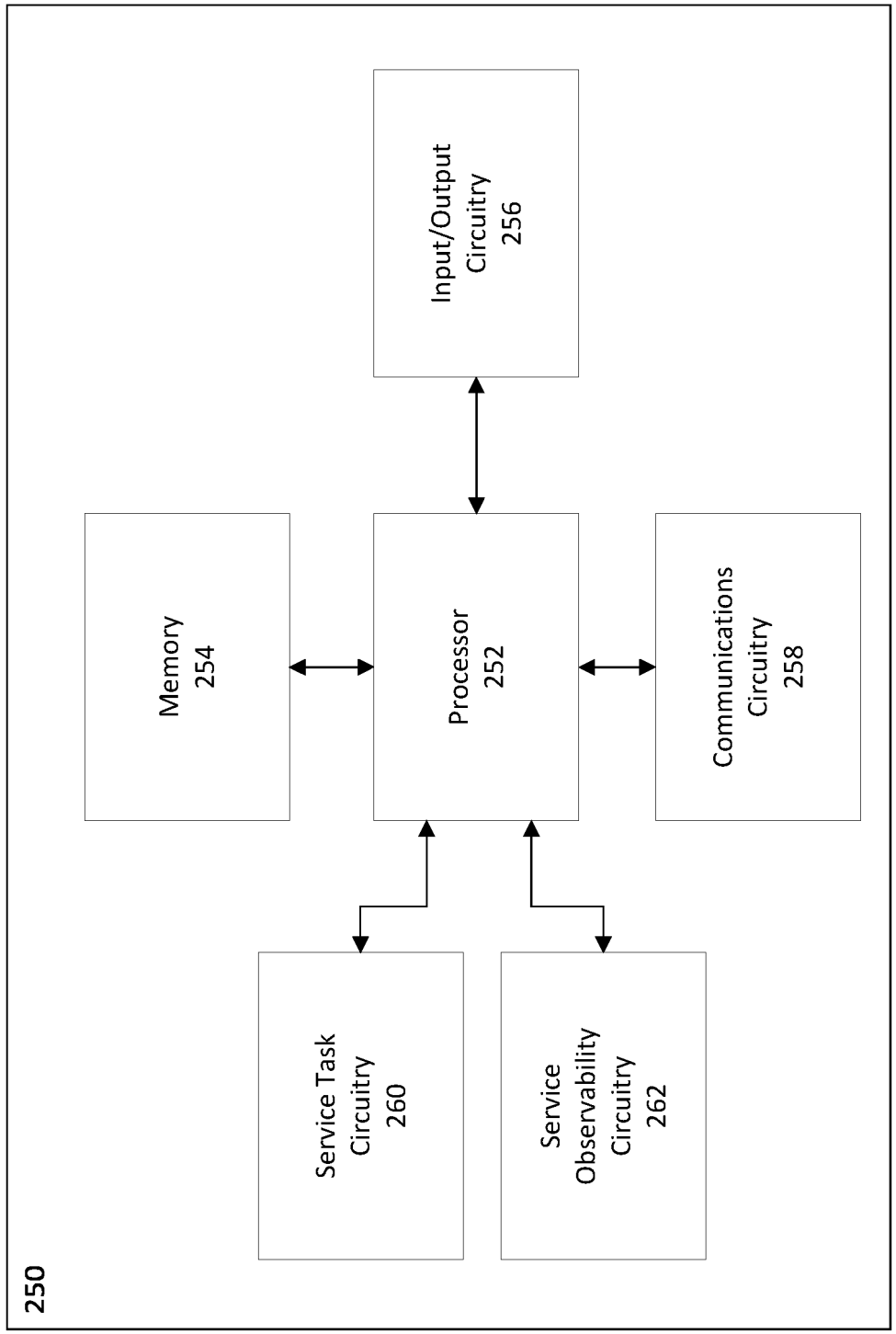
Figure 3:
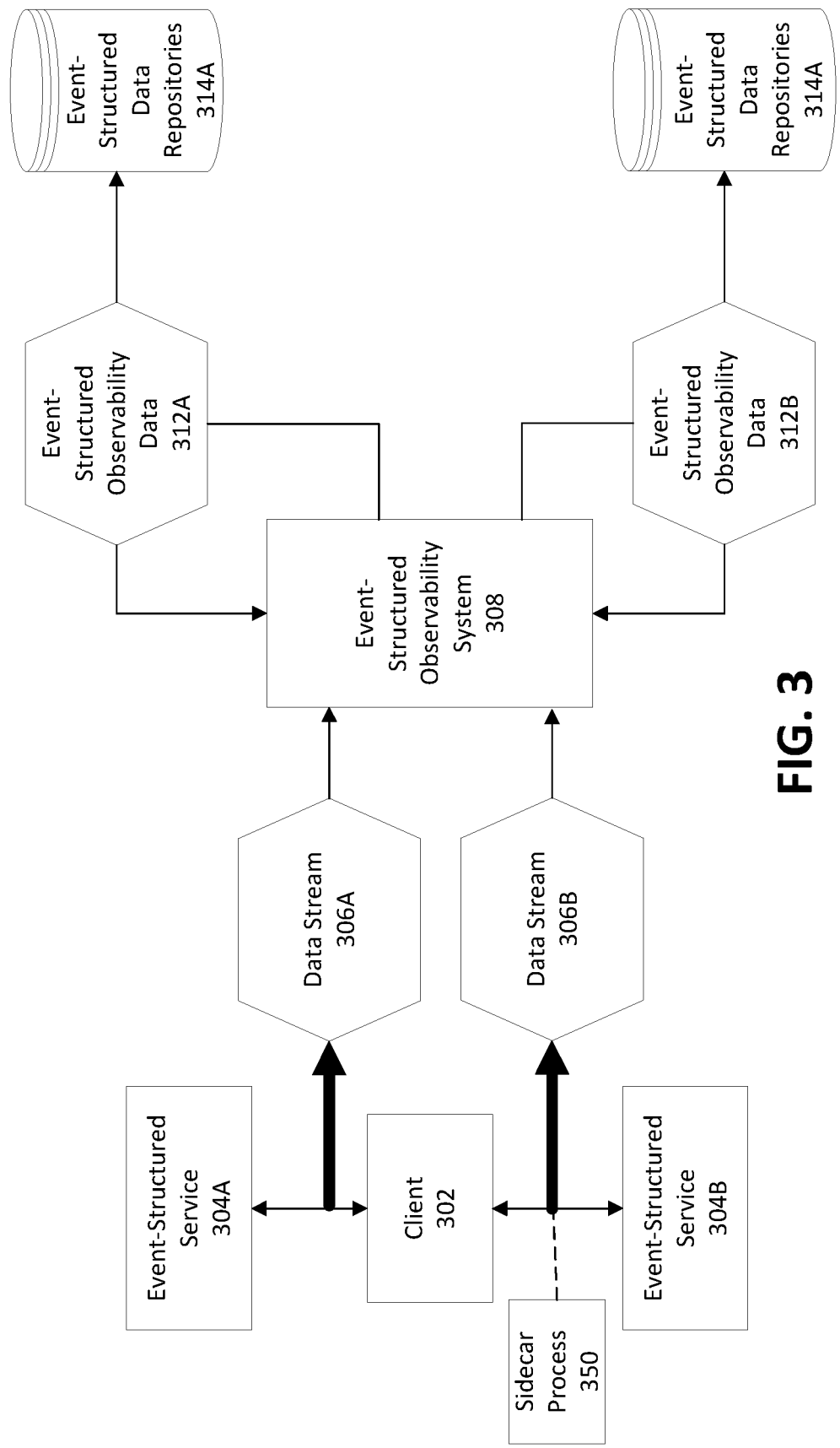
Figure 4:
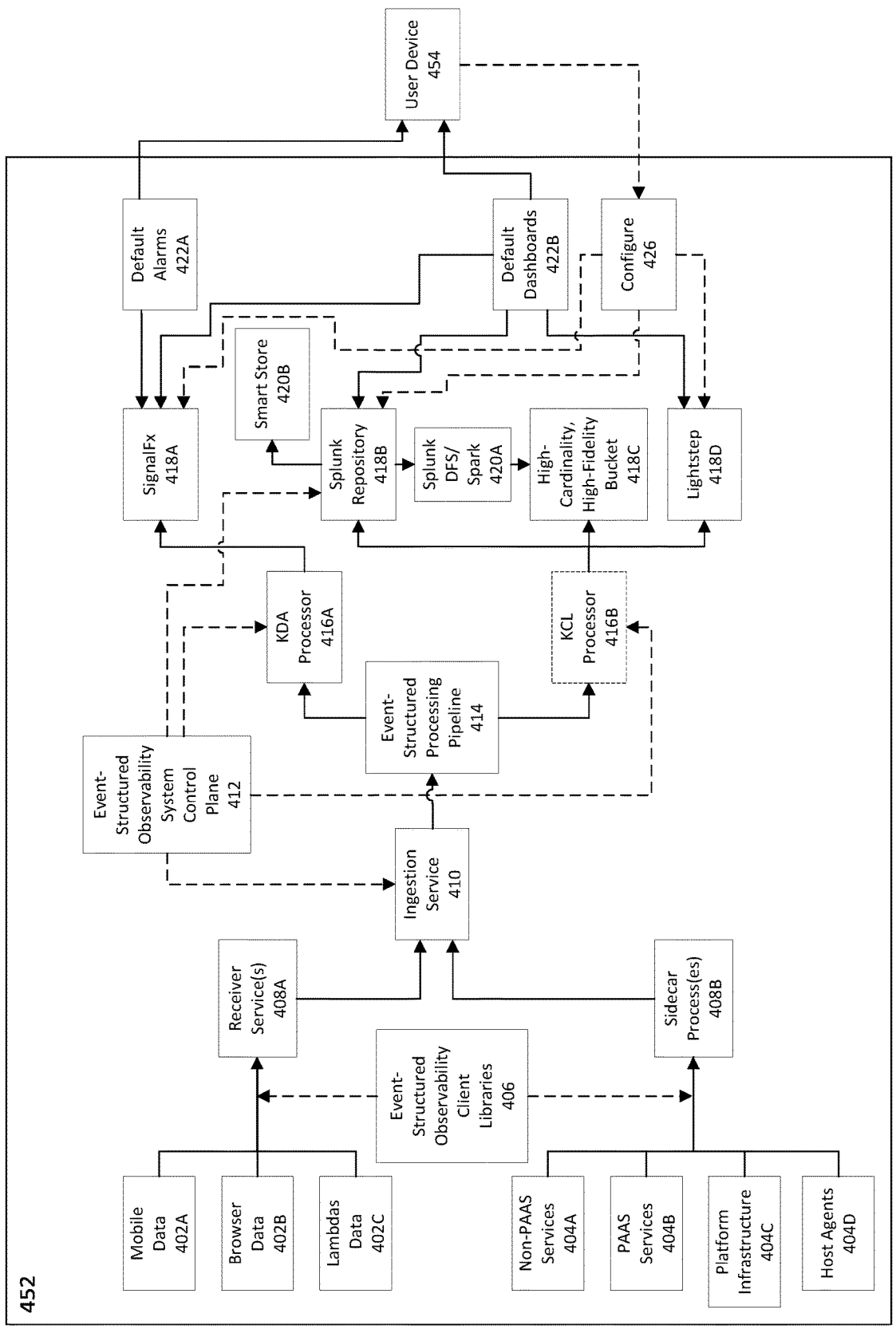
Figure 5:
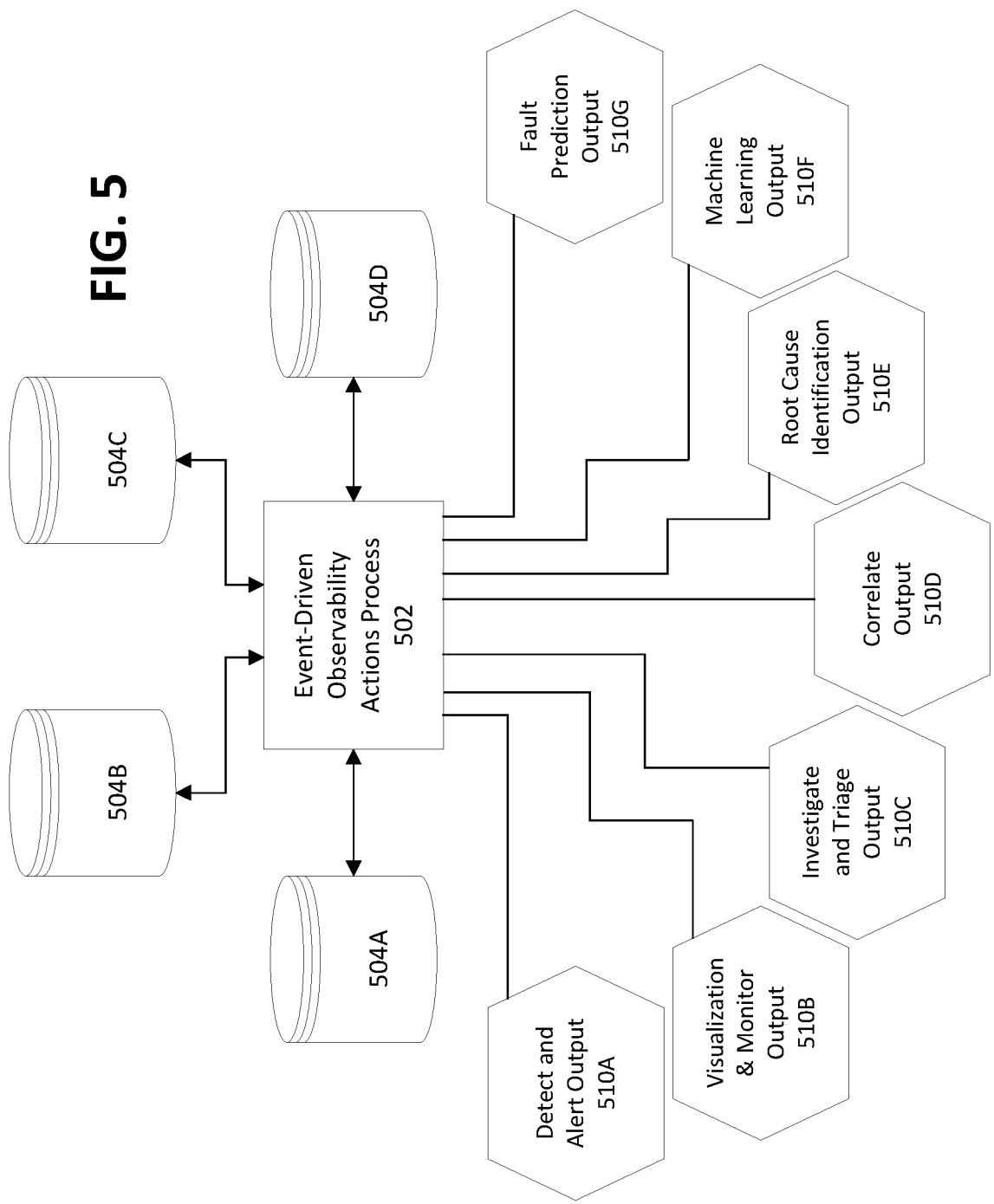
Figure 6B:
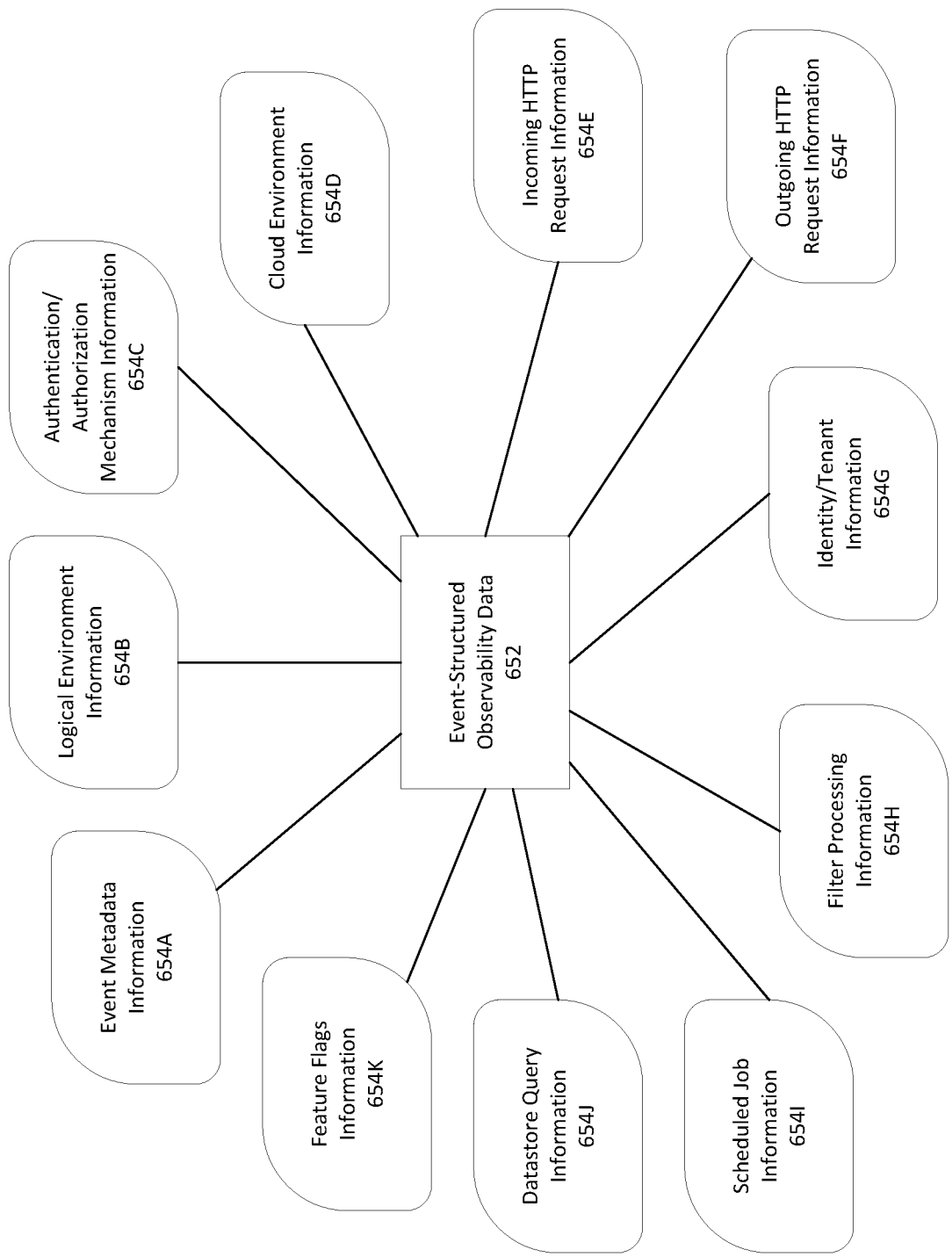
Figure 7:
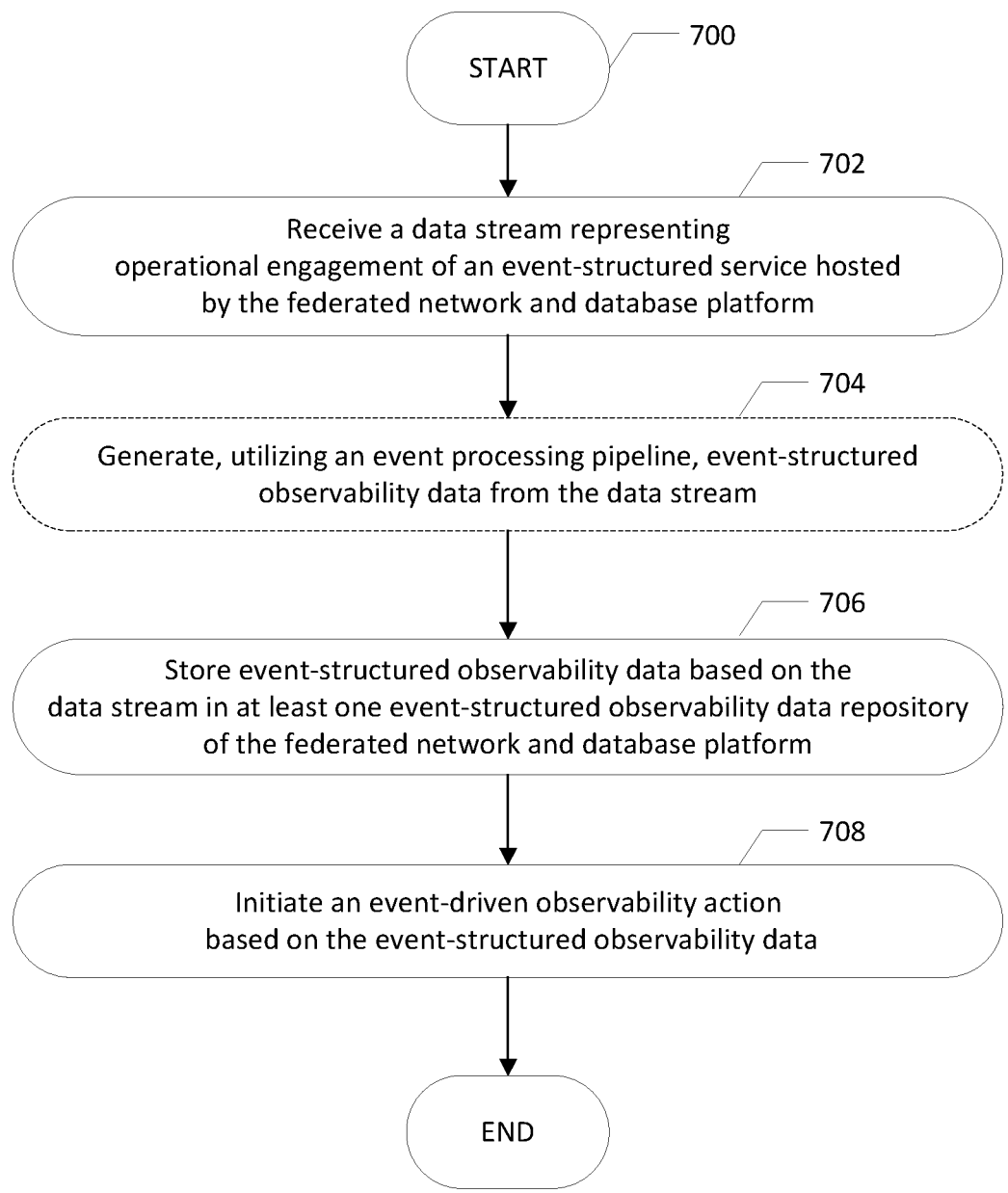
Figure 8:
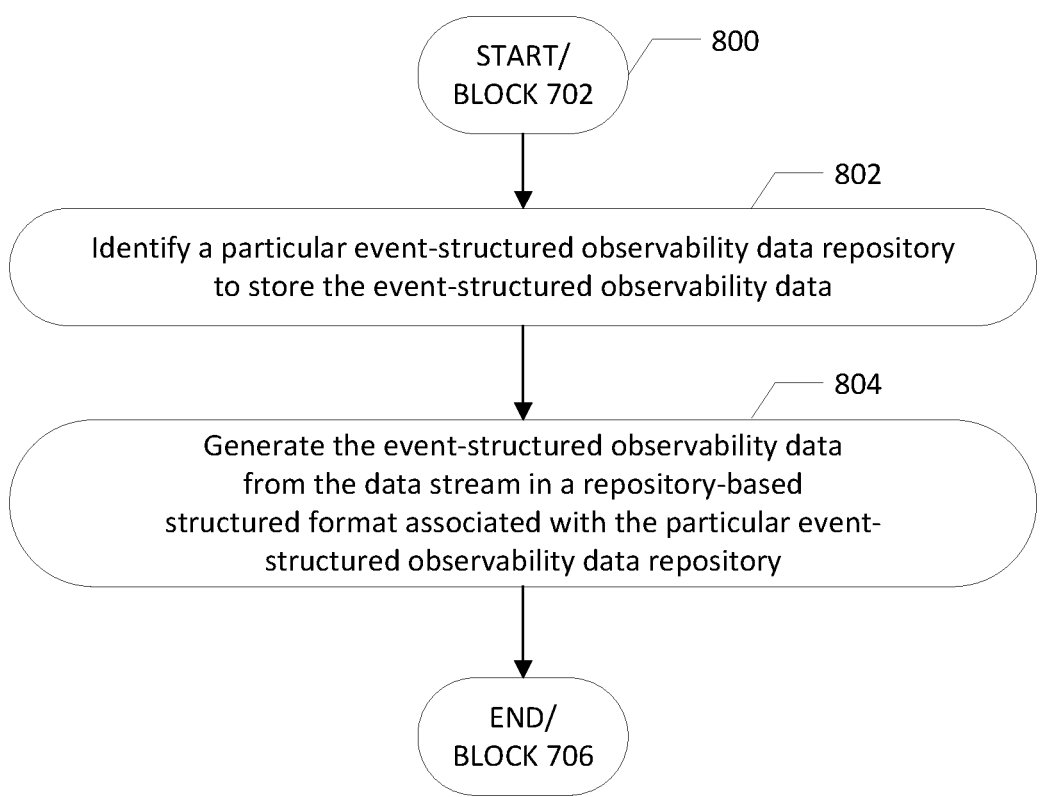
Figure 9:
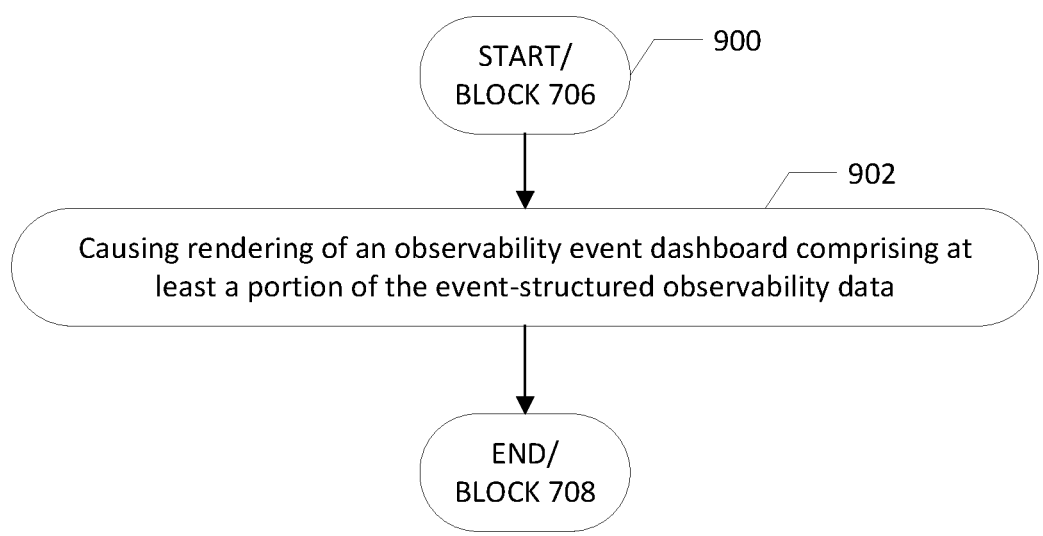
Figure 10:
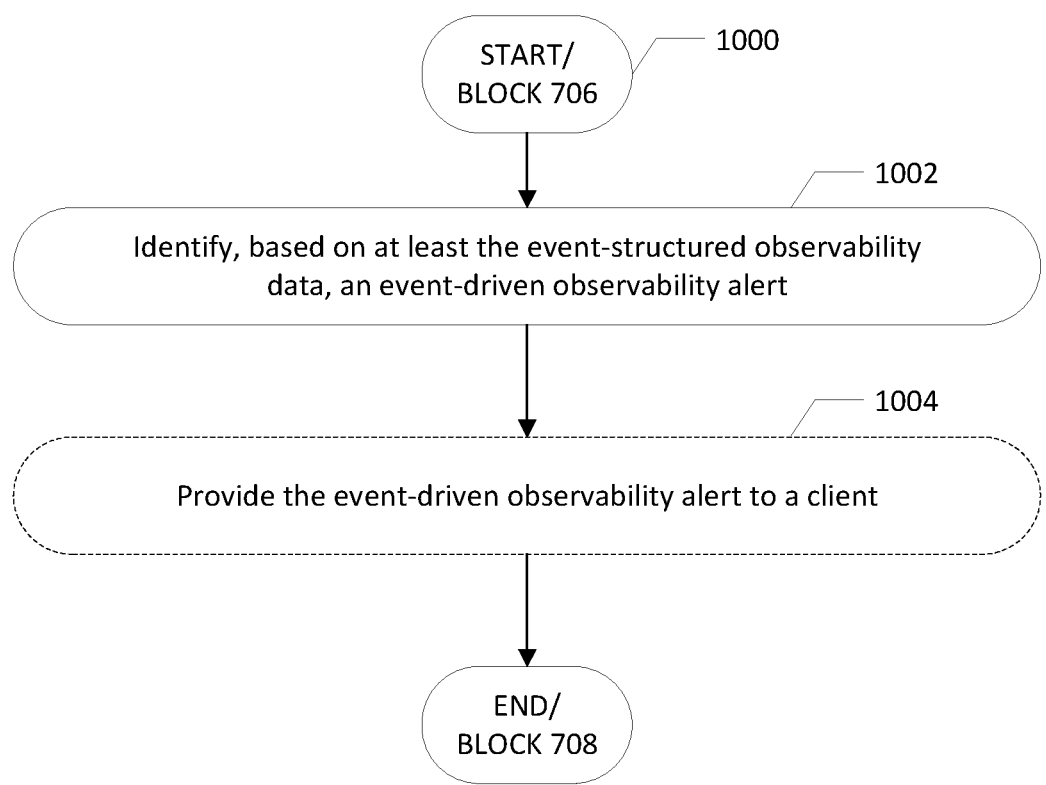
Figure 11:
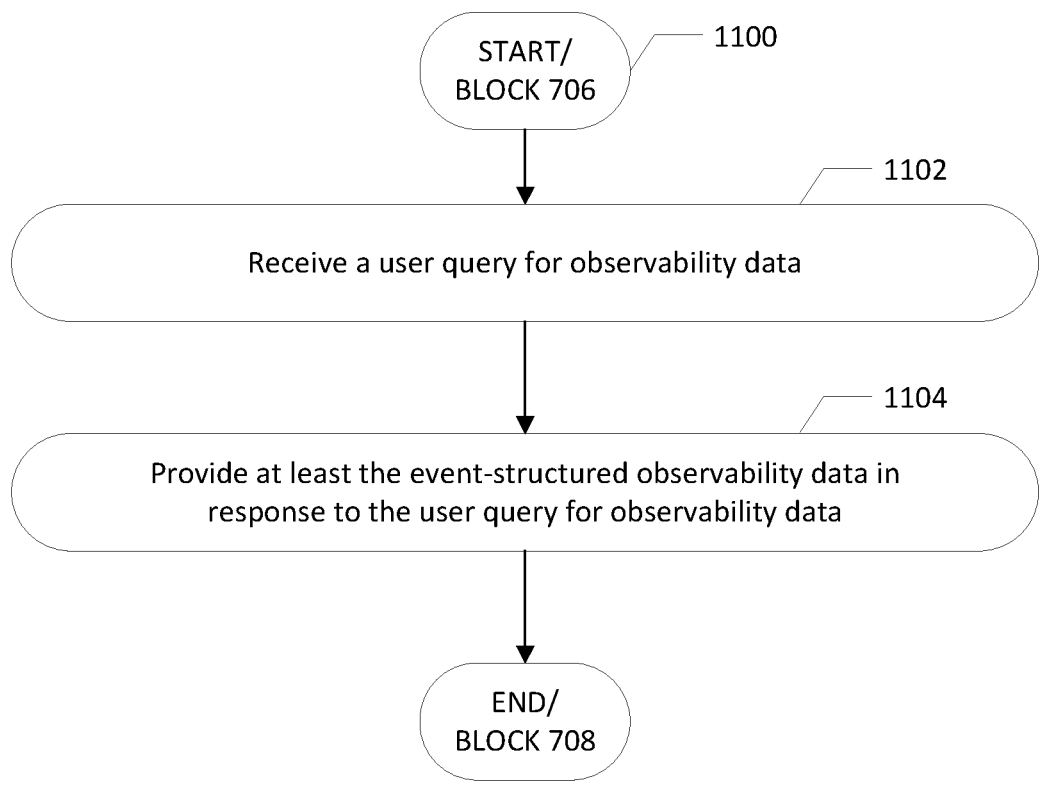
Figure 12:
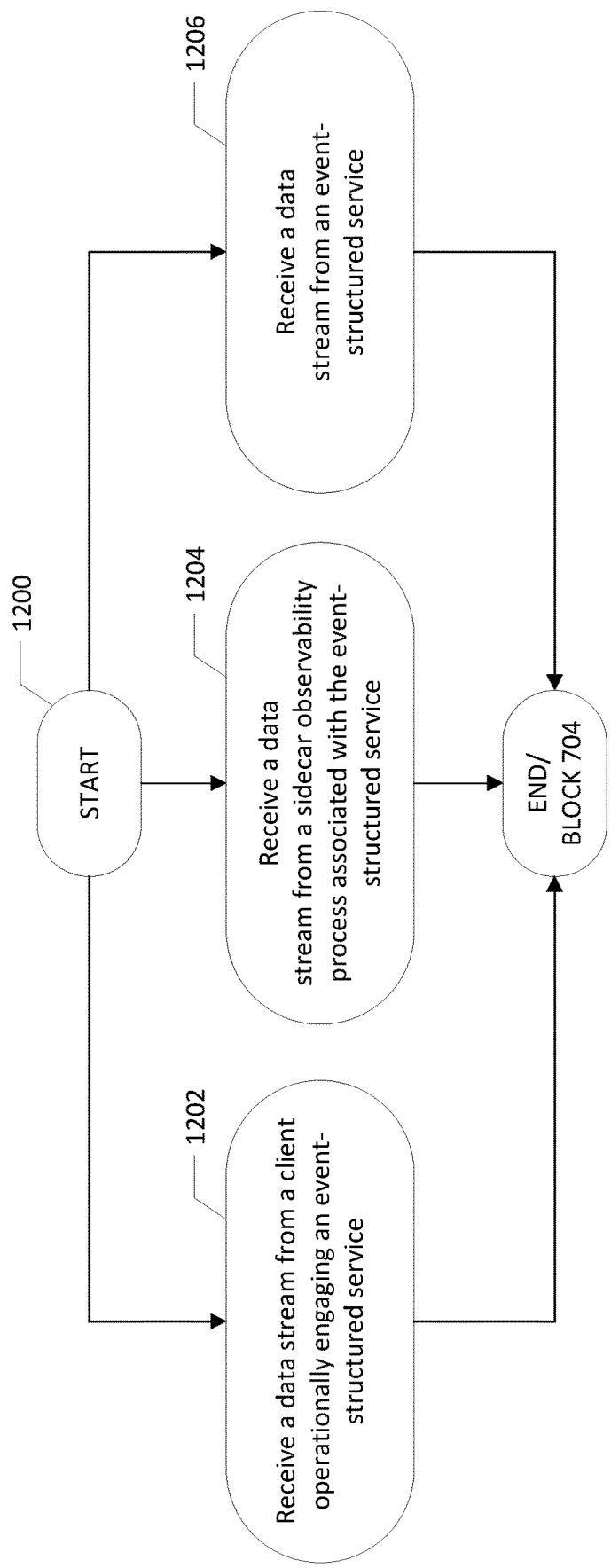

Having thus described the embodiments of the disclosure in general terms, reference now will be made to the accompanying drawings, which are not necessarily drawn to scale, and wherein:

FIG. 1 illustrates an example event-structured observability system deployed within a federated network and database platform configured to provide event-based observability functionality in accordance with example embodiments of the present disclosure;

FIG. 2A illustrates a block diagram of an event-structured observability apparatus specially configured in accordance with example embodiments of the present disclosure;

FIG. 2B illustrates a block diagram of an event-structured service apparatus specially configured in accordance with example embodiments of the present disclosure;

FIG. 3 illustrates a flow diagram visualization of operational interactions between computing elements of an example event-structured observability system deployed within a federated network and database platform configured for event-structured operability functionality in accordance with at least some embodiments of the disclosure;

FIG. 4 illustrates a system architecture diagram of an example event-structured observability system configured for event-structured operability functionality in accordance with at least some embodiments of the disclosure;

FIG. 5 illustrates an example visualization of event-driven observability actions configured to be initiated as part of event-based observability functionality by a particular event-structured observability system in accordance with at least some embodiments of the present disclosure;

FIG. 6A illustrates a visualization of data formatted in accordance with a first data format of a linked observable data stream in accordance with at least some example embodiments of the present disclosure;

FIG. 6B illustrates a visualization of data formatted sub-events of an alternative example data format of event-structured observability data in accordance with at least some example embodiments of the present disclosure;

FIG. 6C illustrates example contextual data associated with particular sub-events of an alternative example data format of event-structured observability data in accordance with at least some example embodiments of the present disclosure;

FIG. 7 illustrates a flowchart including example operations of an example process managing event-structured observability data in a federated network and database platform, as part of providing event-based observability functionality, in accordance with at least some example embodiments of the present disclosure;

FIG. 8 illustrates a flowchart including example operations of an example process for generating and/or storing event-structured observability data for storing in a particular event-structured observability data repository, as part of providing event-based observability functionality, in accordance with at least some example embodiments of the present disclosure;

FIG. 9 illustrates a flowchart including example operations of an example process for initiating an event-driven observability action including rendering of an observability event dashboard, as part of providing event-based observability functionality, in accordance with at least some example embodiments of the present disclosure;

FIG. 10 illustrates a flowchart including example operations of an example process for initiating an event-driven observability action including identification of an event-driven observability alert, as part of providing event-based observability functionality, in accordance with at least some example embodiments of the present disclosure;

FIG. 11 illustrates a flowchart including example operations of an example process for initiating an event-driven observability action including executing a user query for observability data, as part of providing event-based observability functionality, in accordance with at least some example embodiments of the present disclosure; and FIG. 12 illustrates a flowchart including example operations of an example process for receiving at least one event-structured data stream representing operational engagement with an event-structured service, as part of providing event-based observability functionality, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

The deployment of service-based computing systems in a complex federated network and database platform may involve a complicated array of independent services. A complex federated network and database platform may provide access to various applications, each of the applications facilitating features that are supported by a plurality of distributed services (e.g., internal services, external services, microservices, etc.). When data is shared between applications and/or services, the dependency relationships that are formed therebetween may need to be monitored or understood by the application owners, service owners, and/or system architects. Monitoring of these services may be required for service and/or application reliability, scalability, security, regulation compliance, incident management, and many other reasons.

Without proper monitoring through observability tools, applications, features, and/or services can become vulnerable to issues, degradations, errors, incidents, or even denial of service events. Moreover, because applications, features, and/or services can be dependent on other applications, features, or services, a limitation or degradation in one may cause upstream or downstream difficulties for all. If such occurs, it can be particularly difficult to anticipate, repair, discover, or determine a root cause for such limitation or degradation and particularly for such upstream and downstream difficulties.

With many systems engineers, architects, and service development teams distributed globally, consistent observability tools are difficult to build and regularly maintain. Observability tools that rely on simple, discrete and/or independent metrics, logs, and traces are plagued by inefficiencies and inconsistencies associated with data entry and global team distributions. Errors and/or inefficiencies may not be readily determinable or easily anticipated due to an inability to correlate metrics, logs, and traces, and/or process correlated data elements together. Such errors and/or inefficiencies may be exacerbated in circumstances where services are dependent on one another or interrelated, such that errors in a first service may directly cause or otherwise increase the likelihood of errors in another service. Additionally, the nature of an expanding complex federated network and database platforms means that applications and/or services thereof are constantly shifting, while alternative application and service options are expanding, thus making traditional observability deployment architectures less efficient over time.

Large cloud-based software platforms supported by complex federated network and database platform have become more and more reliant on thousands of services and microservices to support various features and applications of the software platform. In view of this vast network of interdependent services, features, and applications, it has become increasingly important to develop robust and scalable observability tools that can monitor and infer health status information for such services, features, and applications, as well as alert and/or initiate corrective processes based on observed data and/or determinations or inferences from observed data.

Various example observability implementations discussed herein aim to provide detection, monitoring, and/or other indications of prospective data-driven issues that may arise as a result of operations and/or interactions of an application, feature, or service. Outputs, interactions, and other software-driven processes of such applications, features, and/or services are monitored to infer health status information and/or to find root causes of incidents and anomalies associated therewith. As complexities in a federated network and database platform increase, implementing efficient, consistent, and robust observability tools for application(s), and/or service(s) thereof, becomes increasingly important and increasingly difficult.

Various embodiments of the present disclosure provide for improved federated network and database observability tools that are configured to use linked observable data elements to enable processing at various levels of granularity with respect to any particular event that was performed or that otherwise occurred in association with a particular service, multiple services, an application, multiple applications, and/or the like. The linked observable data elements provide data-driven insights at various possible levels of granularity, for example, that may be used to infer health status information of service(s), feature(s), and/or application(s).

Observable data elements generated by and/or otherwise processed across a myriad of different software application(s) and/or service(s) thereof provide enhanced observability insights with respect to events performed by a particular service and/or application, or between particular service(s) and/or application(s). Linked observable data elements as discussed herein may be consistently collected in any of a myriad of configurations that enable consistent and efficient storage, while simultaneously enabling observability insights to be provided at various levels of granularity.

Data sets of linked observable data elements, or portions thereof, may be collected and/or processed to provide any of a myriad of observability-related functions, for example, to execute user queries for observability data or perform one or more other observability action(s). In circumstances where data sets being collected and/or processed grow especially large, for example, into thousands, tens of thousands, or more of records, linked observable data elements may be efficiently identified and processed to accurately perform such operations and/or to determine accurate insights. In some example embodiments, the linked observable data elements are built on top of one or more observability protocols. Such implementations enable simplified integration with existing and/or legacy observability-implementing systems and/or tools. For example, metrics, logs, and traces known to be utilized for observability may be gathered via such observability protocols and further specially configured as linked observable data elements to enable such data to be processed for purposes of providing enhanced, event-based insights and observability action(s) described herein.

One example federated network and database platform discussed herein supports and hosts a plurality of event-structured services (e.g., microservices embodying a software tool, a software feature, or a suite of software application tools made available by Atlassian, Inc. and configured to provide observability functionality as described herein). In this regard, such federated network and database includes any number of computing servers, databases, devices, and the like, that facilitate internal and external service functionalities. These service functionalities, alone or in combination with other services, embody corresponding internal and external features that, alone or in combination with other features, embody internal or external application-level functionality to be provided to a user.

Such internal and external service functionalities are desirably monitored through robust and efficient observability tools to enable detection, identification, triaging, predicting, and/or other processing of problems or other errors associated with such service(s). It is further desirable for supporting services and features of a particular application to similarly be monitored through robust and efficient observability tools to enable detection, identification, triaging, predicting, and/or other processing of problems or other errors associated with such supporting services and features.

In one example, a user accessing a particular software application monitored via event-structured observability (e.g., Jira Software®) from a client device triggers functionality of one or more event-structured services associated with or otherwise embodying actions performed via the software application. For example, a user may trigger performance of an operation that triggers one or more data management action(s) associated with the event-structured service (e.g., creation of stored data, deletion of stored data, changing of stored data, and/or the like). Such data management action(s) may trigger changes in upstream or downstream services, features, and/or applications (i.e., changes in more than just the event-structured service with which the user operation was executed). For example, in some contexts, a data management action might trigger operations in other event-structured services associated with event-structured applications hosted by the federated network and database platform (e.g., Jira Service Desk) or another intermediary service (e.g., a credentials management or permissioning service) of the federated network and database platform.

When errors or incidents emerge in connection with a particular software service or application, it can be difficult to identify the root cause of such errors or incidents. It can be particularly difficult to identify the root cause of such errors or incidents when it involves detailed tracing through various upstream independent service(s), and/or even upstream feature(s) and/or applications. For example, errors occurring in a single service (e.g., a user authentication service) can result in upstream errors to other services (e.g., a user account management service), features (e.g., errors in an authentication service resulting in errors in a login feature that relies on the user authentication service), and/or applications (e.g., errors in Jira Service Desk resulting in a particular service shared by both applications).

In accordance with aspects of the present disclosure, operational engagement (either by users, a service itself, or other services) with the event-structured services causes generation and/or collections of a linked observable data elements stream. The linked observable data elements stream includes, for example, structured data embodying observable data elements that are linked together and represent various aspects of actions performed via operational engagement with the event-structured service, data transmissions associated therewith, and/or the like. The linked observable data elements are "linked" via one or more linking identifier(s) that enable the various linked observable data elements to be identified as associated with a particular event. Such linked observable data elements, and/or portions thereof, may be processed together with respect to providing certain event-based observability functionality as described herein. Similarly, the linked observable data elements may be stored in one or more manners, such as via different event-structured observability repositories, to enable retrieval of the various portions of such linked data at any level of granularity.

In circumstances where multiple event-structured services interact with one another in performing a particular event, a linking identifier may be shared with each of the event-structured services. The shared linking identifier enables each event-structured data service to effectively link resulting observable data elements resulting from actions associated with a particular event. Thus, the linkage between the various linked observable data elements indicates that the data is associated with the same particular conceptual event. The different portions and/or types of the linked observable data elements may be processed to provide data insights and/or initiate various actions with respect to the event at one or more levels of data granularity (e.g., by processing a single type of linked observable data element, all linked observable data elements, particularly timed linked observable data elements, and/or the like). In this regard, traditionally disparate and independent activities are associated in a manner that enables higher-level data processing actions to be performed based on the wealth of linked observable data elements without the added complexity and/or decreased data insight that traditionally results from attempts to process observability data maintained in an independent and untethered manner.

In an example context, the linked observable data stream includes linked observable data elements embodying metrics data, logs data, and/or traces data, that is/are structured based on at least one observability protocol and linked via one or more linking identifiers. The linked observable data stream may include such data for events representing actions performed by an event-structured service or between event-structured services. For example, the observable linked data elements may indicate such observable data elements including data values associated with HTTP request(s), data change(s), and/or other predetermined events initiated in response to operational engagement with the event-structured service. The linked observable data elements may be generated and/or otherwise transmitted by a specially configured client library accessible to the event-structured service. The data or metadata of a linked observable data elements stream may be processed to provide insight into various aspects of the actions resulting in the linked observable data elements stream. Alternatively or additionally, the data or metadata of a linked observable data elements stream may be processed to enable any number of determinations associated with such actions to be made. In various other contexts, the linked observable data stream is transmitted by any of the various entities associated with the such action(s) (e.g., the event-structured service, a client device communicating with the event-structured service, a sidecar process associated with the event-structured observability system, and/or the like).

The observable data elements of the linked observable data elements stream may also embody or otherwise include contextual data associated with one or more initiated actions. The contextual data embodied by the portions of the linked observable data elements stream may be processed into an event-structured format for processing and/or storing in any of a myriad of event-structured observability data repositories of the federated network and database platform. For example, in various embodiments, the linked observable data element(s) is/are collected and/or otherwise generated in a manner that represents correlated event information. The various linked observable data elements of a particular linked observable data stream may represent any number of detectable events performed by one or more event-structured services. An event processing pipeline may further process the linked observable data elements stream to store one or more portions of data (e.g., individual linked observable data elements, particular types of linked observable data elements, and/or the like) associated with identifiable event(s) and/or utilizing such data to perform one or more event-driven observability actions associated with the identifiable event(s).

Importantly, specific events are identifiable from the various linked observable data elements (e.g., based on one or more linking identifiers) and are independently processable, partitionable, and/or storable, and similarly processable in conjunction with one another. The wealth of contextual data embodying each event enables storage of such event data in a manner that is cost-effective and efficient, while similarly enabling querying of such event data at one or more desired levels of granularity post-collection for a large number of user-desired queries and/or actions.

Event data (e.g., one or more portions of linked observability data elements associated with a particular event) generated and/or stored according to various embodiments discussed herein is processable to perform any of a number of event-driven observability actions—including, without limitation, error detection and alerting, error root cause identification, fault prediction, and/or the like. Additionally or alternatively, in some embodiments, event data is processable to perform an event-driven observability action that utilizes one or more machine learning model(s) to detect any number of data errors, anomalies, and/or other data-related issues that arise at any point in one or more systems. Additionally or alternatively still, in some embodiments, event data is processable to perform one or more determinations regarding user behavior.

In contrast to conventional observability implementations, embodiments described herein provide observability and querying capabilities at the application, feature, and service functionality level without excess specific user configuring and/or additional implementation, and without specifically configuring the particular data collection steps as mapped with foresight to particular queries to be performed at a future time (i.e., once an incident occurs). Various embodiments of the present disclosure desirably avoid reliance on simple, independent, and/or uncorrelated metrics, logs, and traces. Observability tools that do rely on simple, independent, and/or uncorrelated metrics, logs, and traces are not well-configured to store important service-related data for use over significant lengths of times (e.g., weeks or longer), and not well-configured to process important service-related data as such processing can routinely become computationally prohibitive due to the amount of trace lines, log length, and/or the like. Further simple, uncorrelated metrics, logs, and traces fail to provide sufficient observability insights at various levels of granularity, and generally do not provide sufficient insight to enable complex actions to be performed based on such data. These deficiencies of simple, independent, and/or uncorrelated metrics, logs, and traces are worsened in instances where feature and/or application-level observability is desired in addition to service-level observability.

Embodiments of the present disclosure provide for event-based observability to enable deeper analytical insights and improved event-based actions to be performed than available utilizing conventional implementations for data observability alone. At least some embodiments of the present disclosure utilize particular observability standards (e.g., OpenTelemetry) such that the technical advantages provided by such observability standards are similarly maintained while additionally providing the data insight and action-related technical advantages described herein. Additionally or alternatively, such embodiments reduce the difficulty of instrumentation and implementation of such embodiments from existing and/or "legacy" systems.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "client" refers to one or more computing devices embodied in hardware, software, firmware, and/or any combination thereof in control of a particular user and configured to access one or more remote and/or local software-driven service(s). In some embodiments, for example, a client is in communication with one or more remote servers embodying an event-structured service, as described herein. Non-limiting examples of a client include a mobile phone, a smartphone, a laptop, a personal computer, an enterprise terminal, a tablet, a wearable, a smart home device, and an Internet-of-Things (IoT) enabled device.

The term "service" refers to one or more computing devices embodied in hardware, software, firmware, and/or any combination thereof, that provides discrete software functionality. The discrete software functionality provided by a service specifically serves a particular purpose or accomplishes a particular task. The term "feature" refers to particular software functionality that includes one or more discrete tasks accomplishable by corresponding service(s). The term "application" refers to software functionality embodying all software functionality provided by one or more associated features. In this regard, a single application may include any number of features, with each feature facilitated through any number of services that accomplish the discrete tasks of a feature.

The term "event-structured service" refers to one or more services embodied in hardware, software, firmware, and/or any combination thereof, that is configured to provide discrete software functionality in an observable manner upon, directly and/or indirectly, operable engagement associated with the software functionality. An event-structured service is monitored by an event-structured observability system that receives data stream(s) associated with actions initiated or otherwise performed via the event-structured service. In some embodiments, an event-structured service integrates an event-structured observability client library that interacts with an event-structured observability system for providing event-based observability functionality.

The term "event" refers to a logical piece of work embodying an interaction associated with an event-structured service, or a higher-level feature and/or application, that is identifiable from particular data associated with one or more event-structured service(s). In some embodiments, an event is represented by various portions of data and/or various types of data (e.g., embodying various types of metrics, logs, and traces, and/or associated metadata) correlated to one another that represent various aspects of one or more actions performed by the one or more event-structured service(s). In other embodiments, an event is represented by a particular event payload that includes event information embodying numeric measurements, key/value pairs, nested data structures, and/or other contextual data or metadata that represents a particular logical piece of work embodying an interaction associated with an event-structured service or higher-level feature and/or application. Any number of events of different event types may be represented in one or more event-structured data stream(s) received associated with the event-structured service.

The terms "event-structured" and "event-based" with respect to a computing device refer special configuration of the computing device to generate and/or process data in a particular format that represents a particular event, the event embodying one or more actions performed by or via interaction with one or more services.

The term "federated network and database platform" refers to an interconnected platform including any number of computing systems that, in conjunction with at least one or more shared system(s) and/or functionality associated therewith, provide various event-structured services. The event-structured services of a federated network and database platform in combination embody one or more software applications configured in an observable manner at one or more levels of implementation (e.g., service, feature, and/or application level) utilizing event-based observability functionality as described herein. A federated network and database platform includes at least one computing system that performs database storage services and/or processing services that support functionality for multiple of the computing systems interconnected via the federated network and database platform. The federated network and database platform embodies, includes, or otherwise controls an event-structured observability system that enables collection of event data and/or processing of such event data to provide use cases of data observability functionality (e.g., observability data dashboarding, alerting, and/or the like). Additionally or alternatively, the federated network and database platform embodies, includes, or otherwise controls any number of event-structured observability data repositories. Additionally or alternatively still, in some embodiments, the federated network and database platform includes or otherwise controls one or more computing systems that process the event-structured observability data repositories for purposes of providing improved observability functionality as described herein.

The term "sidecar observability process" refers to a software process distinct from a primary process of an event-structured observability system that offloads processing and routing logic associated with ingestion of an event-structured data stream corresponding to one or more actions of an event-structured service. In some embodiments, a sidecar observability process is embodied by a secondary process operating in a second runtime and/or second computing environment distinct from a first runtime and/or first computing environment within which a primary process of an event-structured observability system is operating, and which communicates with the primary process of the event-structured observability system provide and/or process ingested event-structured data stream(s). In some embodiments, a sidecar observability process is embodied by a secondary software-driven process executed on an event-structured service or a client accessing functionality of an event-structured service. In some embodiments, a sidecar observability process is embodied by a secondary software-driven process executing on a server similarly executing a primary process of an event-structured service.

The term "observable data element" refers to electronically managed data in a structured data format that provides insight into a data-driven interaction or other software process performed by a computing service. Non-limiting examples of an observable data element includes metric data, log data, and trace data generated in response to a particular software process performed by a computing service.

The term "linking identifier" refers to electronically managed data or metadata for association with on rot more observable data element(s) that indicates the observable data element(s) are associated with a particular software process or set of software processes embodying an event. A linking identifier may include one or more sub-identifier(s) embodying linking identifier(s) for sub-processes associated with the particular software process corresponding to the linking identifier. In some embodiments, a linking identifier is included in metadata associated an observable data element. In other embodiments, a linking identifier is included as part a primary payload an observable data element representing the content of the observable data element. Non-limiting examples of a linking identifier include a span identifier, a randomly generated unique identifier, or an encoded identifier (e.g., data including one or more data portions that, based on the value, provide information about a corresponding software process and/or observable data element, for example beginning with "M-" for metric data, "L-" for log data, and "T-" for trace data) generated associated with a software process.

The term "linked observable data element" refers to an observable data element including at least one linking identifier that uniquely corresponds to a particular software process and may be assigned to or otherwise associated with any number of other linked observable data element(s). In some embodiments, a linked observable data element includes a linking identifier in a metadata portion of the linked observable data element. In other embodiments, the linked observable data element includes a linking identifier in a content portion of the linked observable data element. Different types of observable data elements may be embodied as linked observable data elements each linked to one another via at least one linking identifier. For example, a first linked observable data element embodying metrics data associated with a particular linking identifier and a second linked observable data element embodying metrics associated with the same linking identifier may be linked to each other as related to the same software process based on the association with the same linking identifier.

The term "data stream" refers generally to electronically managed data that represents particular aspects of one or more action(s) performed by an event-structured service for providing event-based observability functionality with respect to one or more actions. Non-limiting examples of a data stream include a linked observable data stream and an event-structured data stream.

The term "linked observable data stream" refers to electronically managed data received associated with an event-structured service that includes one or more linked observable data elements including information regarding one or more interactions and/or other software process(es) performed by or otherwise associated with the event-structured service. A linked observable data stream includes linked observable data element(s) associated with any number of linking identifier(s). In this regard, in some contexts, linked observable data elements in a linked observable data stream may, but need not be, associated with any or each other linked observable data element in the linked observable data stream. In some embodiments, a linked observable data stream comprising one or more linked observable data elements is generated and/or provided by a specially configured client library utilized by the event-structured service.

The term "event-structured data stream" refers to electronically managed data representing contextual information, metadata, content data, and/or interaction data associated with interactions performed by or associated with an event-structured service. An event-structured data stream is transmittable and/or otherwise providable to an event-structured observability system for processing and/or storage of the event-structured data stream, portions thereof, and/or event-structured observability data derived therefrom. An event-structured data stream includes one or more data transmission(s), and/or one or more data object(s), communicated between client(s) and computing device(s) that facilitate the functionality associated with the event-structured service. In some embodiments, an event-structured data stream is communicated over a communications network that enables transmission between two computing device(s) and/or system(s).

In some embodiments, an event-structured data stream includes linked observable data element(s) embodying various types of metrics, logs, and/or traces together with metadata embodying at least one linking identifier that links such metrics, logs, and/or traces as associated with one or more particular event(s). An event-structured data stream includes such event information from any number of associated event-structured services, each associated with one another based on the metadata corresponding to each. In some such embodiments, the event-structured data stream utilizes the client libraries, data model, and wire protocol associated with at least metric and trace processing as defined by and associated with the OpenTelemetry observability framework.

The term "event-structured observability data" refers to electronically managed data of a data stream to be processed and/or stored by an event-structured observability system. Event-structured observability data embodies particular portion(s) of information for one or more particular event(s) associated with action(s) of an event-structured service. In some embodiments, event-structured observability data includes one or more portions of a linked observable data stream or event-structured data stream to be stored to a particular event-structured observability data repository. In other embodiments, event-structured observability data includes one or more data objects of an event-structured data stream. Event-structured observability data embodies a single event or any number of events associated with user-initiated interactions of an event-structured service and/or automatically-initiated interactions of an event-structured service. Non-limiting examples of event-structured observability data include particular linked observable data elements of a linked observable data elements stream, and particular data objects embodying event payloads and/or associated metadata of an event-structured data stream.

The term "event processing pipeline" refers to one or more software-driven processes configured to process a received data stream (e.g., a linked observable data stream or an event-structured data stream) to output and/or store corresponding event-structured observability data of the data stream. An event processing pipeline, in some embodiments, stores event-structured observability data embodying portions of a data stream in a particular structured format corresponding to a target event-structured observability data repository for storing the event-structured observability data. In some embodiments, the event processing pipeline includes one or more software processes that extracts various information from the event-structured data stream and generates corresponding event-structured observability data based on the extracted information for use in performing one or more event-driven observability action(s).

The term "event-structured observability data repository" refers to one or more database(s), and/or sub-databases, embodied in hardware, software, firmware, and/or a combination thereof, that stores and/or enables processing of data from a linked observable data stream or an event-structured data stream associated with a particular event, In some embodiments, an event-structured observability data repository processes such data to enable monitoring, and/or management of said data within such database(s). An event-structured observability data repository includes or is associated with any number of associated computing systems that each are configured to perform one or more of such processing, monitoring, and/or management of the event-structured observability data repository. In some embodiments, different event-structured observability data repositories are provided that each store different types of event-structured observability data and/or store event-structured observability data in different structured formats.

The term "event-driven observability action" refers to one or more software-driven processes performed that utilizes or otherwise is based on particular linked observable data element(s) and/or event-structured observability data. Non-limiting examples of an event-driven observability action include processing linked observable data element(s) in a linked observable data stream (or event-structured observability data) to perform one or more specific determinations, causing rendering of one or more observability event dashboard(s) based on the linked observable data element(s), detecting a root cause of a data error based on the linked observable data element(s), executing a user query for observability data, and predicting data errors based on linked observable data elements.

The term "observability event dashboard" refers to one or more interfaces renderable to a client that include interface element(s) configured based on linked observable data element(s) and/or event-structured observability data, and/or interface element(s) that include data values of linked observable data elements (or event-structured observability data) or corresponding events represented by the linked observable data elements (or event-structured observability data).

The term "event-driven observability alert" refers to electronically managed data representing information to be provided to a user based on linked observable data element(s) and/or event-structured observability data. Non-limiting examples of an event-driven observability alert represents information identifying a data and/or processing issue determined to be currently affecting, predicted to affect, and/or determined likely to affect an event-structured service identified based on processing linked observable data element(s) (or event-structured observability data) associated with the event-structured service. Non-limiting examples of an event-driven observability alert refers to information identifying an expected or occurring downtime in functionality access, information identifying an expected or occurring data storage corruption or storage problems, and information identifying an expected or occurring user authentication issues.

The term "user query for observability data" refers to one or more one or more structured data requests for identifying relevant data, and/or data derivable therefrom, stored to one or more event-structured data repositories based on automatically identified and/or user-provided query parameters. In some embodiments, for example, a user query for observability data is embodied by one or more data transmissions to an event-structured service or sidecar observability process that interacts with one or more event-structured observability data repositories to execute the query and provide result data embodying particular retrieved data portions (e.g., linked observable data element(s)) satisfying the query.

The terms "event-structured observability client library" and "client library" refer one or more software application executable(s), programming library/libraries, software development kit(s), and/or plugins that interface with a service to provide monitoring of operational engagement of the service and associated event-based observability functionality. An event-structured observability client library enables collection, generation, and/or identification of one or more data streams, for example linked observable data stream(s) and/or event-structured data stream(s), associated with or otherwise resulting from operational engagement of the service. Additionally, the event-structured observability client library enables provision of such data stream(s) to an event-structured observability system for processing.

Example Systems of the Disclosure

FIG. 1 illustrates an example event-structured observability system 100 deployed within a federated network and database platform 150 configured to provide event-based observability functionality for any number of event-structured service(s) in accordance with example embodiments of the present disclosure. The depicted event-structured observability system 100 links its federated networking and database platform 150 in communication with one or more client(s) 116 over a first communications network 114. In other embodiments, the client(s) 116 are configured to communicate with one or more of the individual event-structured services 104, 106, and/or 108 of the federated network and database platform 150, as described herein, for accessing specific functionality of each of the provided by each event-structured service.

The depicted federated network and database platform 150 includes an event-structured observability system 102 and a plurality of event-structured services 104, 106, and 108. The depicted federated network and database platform 150 also includes a plurality of event-structured observability data repositories 110A, 110B, 110C, and 110D (collectively "event-structured observability data repositories 110"). In some embodiments, one or more of the depicted computing devices of the federated network and database platform 150 are configured to communicate with one another utilizing one or more communication network(s). For example, in the depicted embodiment, the event-structured observability system 102 is configured to communicate with each of the event-structured observability data repositories 110 and each of the event-structured services 104, 106, and 108, over a second communications network 112. In some embodiments, the second communications network 112 is different than the first communications network 114. In other embodiments, the first communications network 114 and the second communications network 112 form part of the same computing network. For example, in one embodiment in which the federated network and database platform forms part of a cloud computing environment, the first communications network 114 and the second communications network 112 may be supported by the Internet.

Each of the depicted event-structured services 104, 106, and 108 embody a different set of functionality facilitated hardware, firmware, and/or software as described. In this regard, the various computing devices of each event-structured service are specially configured and/or interact with one or more other computing devise, and/or software executing thereon, of the event-structured service to provide each respective event-structured service. For example, each of the depicted event-structured services 104, 106, and 108 include at least one specially configured event-structured server, embodied, for example, by the event-structured servers 104A, 106A, and 108A respectively, and at least one service repository, embodied, for example, by the service repositories 104B, 106B, and 108B respectively. In some embodiments, each of the event-structured servers 104A, 106A, and 108A are embodied by a sub-servers of a shared computing system. Additionally or alternatively, in some embodiments, each of the service repositories 104B, 106B, and 108B are embodied by sub-repositories of a shared repository.

It should be appreciated that a given application hosted by the federated network and database platform may be viewed as a set of features facilitating particular functionality associated with the application. Similarly, each of these features may further be implemented utilizing a particular set of services that perform particular discrete tasks associated with a particular feature. As an example, a particular application includes a user login feature that enables a user to submit user authentication credentials for verification, and if successfully verified, begin an authenticated session associated with a particular application. In this regard, the user login feature may be facilitated by services including a user interface configuring service, a credentials input service, a credentials authentication service, and a session initiation service. Each of these services may function alone or in conjunction with one another to provide associated functionality of the feature as described.

Additionally, it should be appreciated that each of these services could experience an incident, data error, or other service problem. For a given service, an incident, data error, and/or other service problem may affects itself (e.g., the service), other services and/or a higher-level feature functionality (e.g., affects the user login feature), and/or affects the application-level as a whole. In this regard, configuring a service as an event-structured service as described herein to enable event-based observability functionality for that service, and/or associated higher-level functionality at the feature or application level for example, is desirable. In circumstances where certain services affect multiple features and/or applications, such event-based observability functionality is especially desirable to identify a single service or group of services causing experiencing specific incident(s), data error(s), and/or service problem(s) from tens, hundreds, thousands, and/or more, of services that facilitate particular application(s).

Each of the depicted event-structured servers and service repositories are specially configured to, in coordination, provide a corresponding event-structured service. For example, in an example context, the event-structured server 104A and the service repository 104B are specially configured to communicate with one another to provide user authentication functionality associated with one or more applications hosted by the federated network and database platform 150. The depicted event-structured server 106A and service repository 106B are specially configured to provide data object storage functionality associated with a particular application. The depicted event-structured server 1068A and service repository 108B are specially configured to provide user data retrieval functionality associated with a particular application. In this regard, the various event-structured services—in cooperation with one another—facilitate features performed as part of one or more applications hosted by the federated network and database platform 150. In some embodiments, one or more of the depicted event-structured services 104, 106, and/or 108 facilitate features of multiple applications hosted by the federated network and database platform 150 (e.g., user authentication service(s) as part of a user login feature for a first and a second application).

In an example context, the event-structured services 104, 106, and 108 (in some embodiments together with additional event-structured services not depicted) facilitate features of a collaborative task-based organization application (e.g., Trello® by Atlassian, Inc.). The collaborative task-based organization is associated with a suite of software applications that may be individually provisioned by a user for access. For example, the suite of software tools additionally includes a collaborative document preparation and publishing service (e.g., Confluence® by Atlassian, Inc.) and/or a project workflow engine service (e.g., Jira Core™ by Atlassian, Inc.). a collaborative document preparation and publishing service (e.g., Confluence® by Atlassian, Inc.). These applications may be each accessible independently by a particular user, as individual applications independently accessible by a particular user, however they may share one or more services that enable features of each of these applications. In this regard, configuring event-structured observability systems enables event-structured functionality that may be utilized to identify and/or process incidents, data errors, and/or service problems from any or each of the perspective of service-level functionality, feature-level functionality, and/or application-level functionality for such applications in the suite.

In some embodiments, event-structured service(s) are monitored with respect to any one or more level(s) of implementation (e.g., service, feature, and/or application) based on the actions associated with an event-structured service or actions between the various event-structured service(s) that embody an event. It should be appreciated that, in other embodiments, event-based observability functionality may similarly be provided for monolithic application(s). In this regard, event-structured data stream(s) and/or corresponding event-structured data associated with the monolithic application may be collected and/or processed to provide the described event-based observability functionality for such an application.

In some embodiments, one or more event-structured service provided via one of the event-structured services 104, 106, or 108 is configured to enable collection and/or provision of linked observable data elements stream(s) (or alternatively, event-structured data stream(s)) utilized in event-based observability functionality as described herein. For example, in some embodiments, the event-structured server 104A and/or 106A are configured to generate and/or identify linked observable data elements stream(s) (or alternatively, event-structured data stream(s)) in response to and/or otherwise based on interactions performed by or otherwise associated such event-structured service(s). In some embodiments, for example, the event-structured server 104A and/or 106A is configured to generate and/or identify linked observable data elements stream(s) (or alternatively, event-structured data stream(s)) that result from user-initiated interactions with the event-structured service, interactions initiated by other event-structured service(s), and/or that result from automatically-initiated interactions (e.g., data-driven interactions initiated automatically by the event-structured service itself).

In some such embodiments, a primary process of an event-structured service (e.g., executed via the event-structured server 104A) identifies, generates, and/or collects linked observable data elements embodying such linked observable data elements stream(s) (or alternatively, identifies, generates, and/or collects event-structured data stream(s)) as such interactions occur. For example, in some embodiments, the event-structured service utilizes or otherwise accesses a specially configured client library to identify, generate, and/or collect a linked observable data elements stream including any number of linked observable data elements. In this regard, the event-structured service may inject one or more linking identifiers that uniquely identify particular events into observable data elements to generate the linked observable data elements of a particular linked observable data elements stream. In some other embodiments, the linked observable data elements stream (or alternatively the event-structured data stream(s)) associated with an event-structured service is/are generated and/or identified by a sidecar observability process corresponding to the event-structured service or multiple event-structured services.

It should be appreciated that the sidecar observability process may be executed in the same runtime environment and/or computing environment as the primary process associated with the event-structured service, or in some other embodiments may be executed in a different runtime environment and/or a different computing environment than the primary process. For example, as depicted, the event-structured service 108 includes a sidecar computing server 108C configured to execute a sidecar process associated with the event-structured service provided by the event-structured service 108. In other embodiments, the event-structured server 108A is configured to execute both a primary process associated with an event-structured service and a sidecar process associated with the event-structured service utilizing separate runtime environments via shared computing hardware, such that a separate server or other computing environment (e.g., the sidecar computing server 108C) is not utilized.

In some such embodiments, an event-structured service provides and/or otherwise transmits the linked observable data elements stream(s) (or alternatively, event-structured data stream(s)) associated with a particular event-structured service for further processing associated with event-based observability functionality, as described herein. For example, in some embodiments as depicted, each of the event-structured services 104, 106, and 108 communicate with the event-structured observability system 102 to provide such collected and/or otherwise identified linked observable data elements stream(s) (or alternatively, event-structured data stream(s)) to the event-structured observability system 102 for processing and/or storage. Alternatively or additionally, in some embodiments, one or more of the event-structured services 104, 106, and/or 108 is associated with its own sub-platform of the event-structured observability system 102 that is specifically configured to handle linked observable data elements stream(s) (or alternatively, event-structured data stream(s)) from the specific event-structured service(s) corresponding to that sub-platform.

The linked observable data elements stream(s) (or alternatively, event-structured data stream(s)) collected from one or more event-structured service(s) may include various data portions associated with the interactions performed by an event-structured service and/or otherwise associated event-structured service(s). corresponding to a particular event. For example, client libraries for each of the event-structured service(s) may collect event-structured data stream(s) comprising metric data, log data, and/or trace data related to such events. The specially configured client libraries may link each related metric data, log data, and/or trace data collected associated with a particular event via one or more linking identifier(s) to indicate such data is associated with a particular event, for example one or more span identifier(s). The event-structured observability system 102 may receive such a linked observable data elements stream and process the portion(s) of the linked observable data elements stream to provide the event-based observability functionality described herein. In some embodiments, separate but associated portions of a linked observable data elements stream may be stored in independent event-structured data repositories, and retrieved and associated with one another for processing. For example, linked (or otherwise associated) portions of stored data (e.g., metric data, log data, and trace data) linked to a particular event based on one or more identifier(s) may be retrieved and processed to initiate and/or otherwise provide one or more event-structured action(s) as described herein.

The event-structured observability system 102 includes any number of computing devices embodied in software, hardware, firmware, and/or a combination thereof, that provides event-based observability functionality. The event-structured observability system 102 facilitates such event-based observability functionality associated with one or more of the event-structured services 104, 106, and/or 108, additional event-structured service(s) (not depicted), and/or features and/or applications embodied by such event-structured services. It should be appreciated that the event-structured observability system 102 may be embodied by any number of sub-servers, services, and/or the like. For example, in some embodiments, the event-structured observability system 102 is embodied by a plurality of services configured to perform discrete tasks embodying or facilitating event-based observability functionality.

In some embodiments, the event-structured observability system 102 provides event-based observability functionality associated with one or more event-structured services, for example provided by each of the event-structured services 104, 106, and 108. for example, in some embodiments, the event-structured observability system 102 embodies any number of computing devices that receive a linked observable data elements stream(s) (or alternatively, an event-structured data stream), processes the linked observable data elements stream(s) (or alternatively, event-structured data stream) to generate and/or otherwise extract corresponding particular portions embodying event-structured observability data. Additionally or alternatively, the event-structured observability system 102 is further configured for storing such event-structured observability data in one or more event-structured observability data repositories. Additionally or alternatively, the event-structured observability system 102 is further configured for initiating and/or otherwise performing one or more event-driven observability action(s) based on the event-structured observability data.

The event-driven observability action(s) may be performed in real-time upon receiving the event-structured observability data, and/or at a later time based on the retrieved event-structured observability data and/or other retrieved event-structured observability data from the one or more event-structured observability data repositories at a later time (for example upon user-initiation of one or more of such event-driven observability action(s), at preset or otherwise determinable time intervals, and/or the like). The event-structured observability system 102 maintains an event processing pipeline that processes a received linked observable data elements stream(s) (or alternatively, event-structured data stream) to store corresponding event-structured observability data, as described herein.

In some embodiments, the event-structured observability system 102 deploys or integrates with one or more sub-systems embodied in hardware, software, firmware, and/or the like, of an event-structured service. In this regard, such components of the event-structured observability system 102 may logically sit close to the application(s) and/or system(s) that are to be monitored. For example, the event-structured observability system 102 may deploy or otherwise integrate with one or more application(s) deployed on the event-structured service 108 to enable event-based observability functionality associated with the event-structured service 108. In this regard, the event-structured observability system 102 may be considered to include such components of system(s), application(s), and/or the like that would otherwise be separate.

The event-structured observability data repositories 110 each include any number of computing devices configured to store event-structured observability data from one or more data streams. For example, in some embodiments, each of the event-structured observability data repositories 110 embodies any number of memory storage devices, data center devices, and/or corresponding processing servers. Additionally or alternatively, in some embodiments, each of the event-structured observability data repositories 110 includes one or more servers configured to enable management of data stored in the repository (e.g., storing new data, deleting stored data, retrieving data stored in the repository, and the like) and/or monitor, interact with, and/or otherwise analyze the data stored in the repository. It should be appreciated that, in some embodiments, an event-structured observability data repository embodies a local data repository controlled by an entity associated with the federated network and database platform 150 (e.g., in a physical location owned and/or secured by the entity). In some other embodiments, an event-structured observability data repository embodies a cloud data repository remotely located from one or more other components of the federated network and database platform 150, for example embodied by one or more remote specially configured server(s) of a cloud data center.

The client(s) 116 embody one or more user devices, accessible by particular user(s), that enable access to the distributed network and database platform 150. In some embodiments, for example, the client(s) 116 includes or embodies a plurality of user mobile devices (e.g., wearables, mobile phones, smartphones, tablets, personal digital assistants, and/or the like), user personal computers (e.g., desktops, laptops, netbooks, and/or the like), and/or other user personal computing devices (e.g., specially designed hardware devices). The client(s) 116 each include specially configured software and/or firmware that enables the client to perform functionality associated with various software applications. For example, in some circumstances, a client of the client(s) 116 is configured with an operating system that provides any of a myriad of standardized functionality, such as enabling networking capabilities, software application execution, display capabilities, and/or the like. In some embodiments, for example, the operating system of each client of the client(s) 116 enables maintenance of any number of software applications installed to and/or otherwise executing on the client.

Each of the client(s) 116 enables access to the federated network and database platform 150, and/or specific sub-systems thereof. For example, in some embodiments, a client of the client(s) 116 interacts with one of the event-structured services 104 to access particular applications hosted by the federated network and database platform 150. In this regard, for example, the client(s) 116 may embody user devices of various users that utilize the applications to perform functionality provided by one or more of the event-structured services 104, 106, and/or 108. In this regard, as one or more of the client(s) 116 interact with one of the federated network and database platform 150 through the event-structured services 104, 106, and/or 108 (and/or additional event-structured services not depicted), linked observable data elements stream(s) (or alternatively, event-structured data stream(s)) are generated and/or identified, and provided to the event-structured observability system 102, as described herein. For example, the interactions initiated by the user via the client(s) 116 may cause operational engagement of one or more of the event-structured services 104, 106, and/or 108.

Alternatively or additionally, in some embodiments, one or more of the client(s) 116 interacts with the event-structured observability system 102 to access particular event-based observability functionality. For example, such event-based observability functionality is associated with one or more of the event-structured services 104, 106, and/or 108. In this regard, the event-structured observability system 102 may be accessed to provide querying, monitoring, alerting, and/or other event-based observability functionality for one or more of the event-structured services associated with a particular user. In some embodiments, a client of the client(s) 116 securely connects with the federated network and database platform 150 remotely (e.g., via a virtual private network) to enable access, via the event-structured observability system 102, of the event-based observability functionality associated with event-structured service(s) of the federated network and database platform 150.

In some embodiments, a client of the client(s) 116 accesses the federated network and database platform 150, and/or one or more sub-systems thereof, via one or more native software applications installed to and/or executed via the client(s) 116. Alternatively or additionally, in some embodiments, a client of the client(s) 116 accesses the federated network and database platform 150, and/or one or more sub-systems thereof, via a web-application executed via a browser application installed on the client(s) 116.

Example Apparatus of the Disclosure

Have discussed example systems in accordance with the present disclosure, example apparatuses in accordance with the present disclosure will now be described. In some embodiments, the event-structured observability system 102 as described herein with respect to FIG. 1 is embodied by one or more computing systems. For example, in some embodiments, the event-structured observability system 102 is embodied by the event-structured observability apparatus 200 as depicted and described in FIG. 2A. The event-structured observability apparatus 200 includes processor 202, memory 204, input/output circuitry 206, communications circuitry 208, event data ingestion circuitry 210, event data processing circuitry 212, event data storing circuitry 214, and/or event action circuitry 216. The event-structured observability apparatus 200 may be configured, using one or more of the sets of circuitry 202, 204, 206, 208, 210, 212, 214, and/or 216 to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the event-structured observability apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the event-structured observability apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the event-structured observability apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the event-structured observability apparatus 200, and/or one or more remote or "cloud" processor(s) external to the event-structured observability apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations of event-based observability functionality. In some embodiments, the processor 202 includes hardware, software, firmware, and/or a combination thereof, that receives a linked observable data elements stream, stores at least a portion of the linked observable data elements stream in at least one event-structured observability data repository, and initiating an event-driven observability action based on the stored portion(s) of the linked observable data elements stream. In some such embodiments, the processor 202 additionally or alternatively includes hardware, software, firmware, and/or a combination thereof, that processes the stored portion(s) of linked observable data elements stream (e.g., one or more linked observable data elements) to cause rendering of one or more observability event dashboards, initiate one or more event-driven observability actions, and/or process one or more user queries for observability data.

In some other embodiments, the processor 202 includes hardware, software, firmware, and/or a combination thereof, that receives event-structured data stream(s) representing operational engagement of an event-structured service, for example an event-structured service hosted by a federated network and database platform. Additionally or alternatively, in some embodiments, the processor 202 includes hardware, software, firmware, and/or a combination thereof, that generates event-structured observability data from the event-structured data stream utilizing an event processing pipeline. Additionally or alternatively, in some embodiments, the processor 202 includes hardware, software, firmware, and/or a combination thereof, that stores the event-structured observability data in at least one event-structured observability data repository, for example an event-structured observability data repository of a federated network and database platform. Additionally or alternatively, in some embodiments, the processor 202 includes hardware, software, firmware, and/or a combination thereof, that initiates an event-driven observability action based on the event-structured observability data. For example, in some embodiments, includes hardware, software, firmware, and/or a combination thereof, that causes rendering of an observability event dashboard, identifies an event-driven observability alert, executes a received user query for observability data, and/or identifies a root cause of a data error that occurred with respect to an event-structured service. In some embodiments, the processor 202 performs one or more of such actions in combination with another set of circuitry of the event-structured observability apparatus 200.

The input/output circuitry 206 provides output to the user and, in some embodiments, receives one or more indication(s) of user input. In some embodiments, the input/output circuitry 206 is in communication with processor 202 to provide such functionality. The input/output circuitry 206 may comprise one or more user interface(s) and/or may include a display that may comprise the user interface(s) rendered as a web user interface, an application interface, and/or the like, to the display of a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising or otherwise interacting with the processor 202 may be configured to control one or more functions of one or more user interface elements through computer program instructions (e.g., software and/or firmware) stored on a memory accessible to the processor (e.g., memory 204, and/or the like).

The communications circuitry 208 may embody any device, circuitry, and/or other means embodied in hardware, software, firmware, and/or a combination of hardware, software, and software, that is configured to receive and/or transmit data from/to a network and/or any other device, circuitry, or module of or in communication with the event-structured observability apparatus 200. In this regard, the communications circuitry 208 may include, for example, a network interface for enabling communications with a wired or wireless communication network. For example, the communications circuitry 208 may include one or more network interface card(s), antenna(s), bus(es), switch(es), router(s), modem(s), and supporting hardware and/or software, or any other device suitable for enabling communications via one or more communication network(s). Additionally or alternatively, the communications circuitry 208 may include circuitry for interacting with the antenna(s) and/or other hardware or software to cause transmission of signals via the antenna(s) or to handle receipt of signals received via the antenna(s).

The event data ingestion circuitry 210 includes hardware, software, firmware, and/or a combination thereof, configured to support various interaction with event-structured service(s) to enable receiving of linked observable data stream(s) (or alternatively, event-structured data stream(s)). In some embodiments, the event data ingestion circuitry 210 utilizes processing circuitry, such as the processor 202 and/or the like, to perform one or more of such actions. For example, in some embodiments, the event data ingestion circuitry 210 includes hardware, software, firmware, and/or a combination thereof, that establishes a connection with an event-structured service of a federated network and database platform, and/or a connection with a client accessing event-based observability functionality as described herein. In this regard, the connection with the event-structured service enables monitoring of operational engagement of the event-structured service for purposes of facilitating event-based observability functionality, as described herein. Additionally or alternatively, in some embodiments, the event data ingestion circuitry 210 includes hardware, software, firmware, and/or a combination thereof, that receives transmission(s) embodying linked observable data stream(s) (or alternatively event-structured data stream(s)), and/or generates linked observable data stream(s) (or alternatively event-structured data stream(s)) associated with operational engagement of the event-structured service(s) with which a connection is established in response to transmission(s) from the event-structured service. In some embodiments, the event data ingestion circuitry 210 includes hardware, software, firmware, and/or the like that requests linked observable data stream(s) (or alternatively event-structured data stream(s)) from an event-structured service and/or sidecar observability process associated therewith. It should be appreciated that, in some embodiments, the event data ingestion circuitry 210 may include a separate processor, specially configured field programmable gate array (FPGA), or a specially programmed application specific integrated circuit (ASIC), to perform such functionality.

The event data processing circuitry 212 includes hardware, software, firmware, and/or the like configured to support various functionality associated with processing data stream(s) (for example, linked observable data stream(s) and/or event-structured data stream(s)). In some embodiments, the event data processing circuitry 212 utilizes processing circuitry, such as the processor 202 and/or the like, to perform one or more of such actions. For example, in some embodiments, the event data processing circuitry 212 includes hardware, software, firmware, and/or a combination thereof, that extracts or generates event-structured observability data from the linked observable data stream(s) (or alternatively event-structured data stream(s)) for processing and/or storing. In some such embodiments, the event data processing circuitry 212 includes hardware, software, firmware, and/or a combination thereof that embodies or maintains an event processing pipeline for purposes of generating and/or storing event-structured observability data from linked observable data stream(s) (or alternatively event-structured data stream(s)). It should be appreciated that, in some embodiments, event data processing circuitry 212 generates and/or stores event-structured observability data in a particular desired data format, as described herein. Alternatively or additionally, in some embodiments, the event data processing circuitry 212 includes hardware, software, firmware, and/or the like to configure aspects of such processing, such as configuring the event processing pipeline and/or the like. It should be appreciated that, in some embodiments, the event data processing circuitry 212 may include a separate processor, specially configured field programmable gate array (FPGA), or a specially programmed application specific integrated circuit (ASIC), to perform such functionality.

The event data storing circuitry 214 includes hardware, software, firmware, and/or a combination thereof, configured to support storage of event-structured observability data embodying portions of data in a linked observable data elements stream or event-structured data stream in one or more event-structured data repositories and/or retrieval of event-structured observability data from one or more event-structured data repositories. In some embodiments, the event data storing circuitry 214 utilizes processing circuitry, such as the processor 202 and/or the like, to perform one or more of such actions. For example, in some embodiments, the event data storing circuitry 214 includes hardware, software, firmware, and/or a combination thereof, that facilitates storage of event-structured observability data in one or more event-structured data repositories. In some embodiments, linked observable data elements embodying particular event-structured observability data may be stored and/or retrieved based on a linking identifier that associates various data portions corresponding to a particular event (or sub-events associated therewith). For example, in some embodiments, the event data storing circuitry 214 establishes and/or maintains a connection with one or more of such event-structured data repositories, and/or communicates with such event-structured data repositories for which a connection has been established to facilitate the storage. In some embodiments, the event data storing circuitry 214 includes hardware, software, firmware, and/or a combination thereof, that formats and/or otherwise updates event-structured observability data in a particular repository data format for storing in one or more particular event-structured observability data repositories. In some embodiments, the event data storing circuitry 214 includes hardware, software, firmware, and/or a combination thereof, that retrieves event-structured observability data from one or more event-structured data repositories. In some such embodiments, for example, the event data storing circuitry 214 includes hardware, software, firmware, and/or a combination thereof that processes user queries for observability data. For example, in some embodiments, the event data storing circuitry 214 includes hardware, software, firmware, and/or a combination thereof, that receives a user query for observability data, and queries one or more event-structured data repositories for response data based on the user query for observability data. In some embodiments, the event data storing circuitry 214 includes hardware, software, firmware, and/or a combination thereof, that processes a user query for observability data into a plurality of sub-queries for processing. It should be appreciated that, in some embodiments, the event data storing circuitry 214 may include a separate processor, specially configured field programmable gate array (FPGA), or a specially programmed application specific integrated circuit (ASIC), to perform such functionality.

The event action circuitry 216 includes hardware, software, firmware, and/or a combination thereof, configured to support initiation and/or execution of event-driven observability action(s) based on event-structured observability data. In some embodiments, the event action circuitry 216 utilizes processing circuitry, such as the processor 202 and/or the like, to perform one or more of such actions. For example, in some embodiments, the event action circuitry 216 includes hardware, software, firmware, and/or a combination thereof, that transmits one or more communications that initiate a particular event-driven observability action. In some embodiments, the event action circuitry 216 generates one or more specially configured transmissions to communicate with one or more specially configured systems, services, and/or the like, to execute an event-driven observability action. Additionally or alternatively, in some embodiments, the event action circuitry 216 executes the event-driven observability action itself. For example, in some embodiments, the event action circuitry 216 includes hardware, software, firmware, and/or a combination thereof, that processes event-structured observability data to detect a data error, incident, and/or service problem, and/or alert one or more clients regarding the data error, incident, and/or service problem. Additionally or alternatively, for example, in some embodiments, the event action circuitry 216 includes hardware, software, firmware, and/or a combination thereof, that processes event-structured observability data to visualize and monitor the event-structured observability data. Additionally or alternatively, for example, in some embodiments, the event action circuitry 216 includes hardware, software, firmware, and/or a combination thereof, that processes event-structured observability data to investigate cause(s) of a data error, incident, and/or service problem, and/or triage service(s) associated with the data error, incident, and/or service problem. Additionally or alternatively, for example, in some embodiments, the event action circuitry 216 includes hardware, software, firmware, and/or a combination thereof, that correlates event-structured observability data, for example associated with a particular event-structured service, and/or an associated feature or application. Additionally or alternatively, for example, in some embodiments, the event action circuitry 216 includes hardware, software, firmware, and/or a combination thereof, that processes event-structured observability data to identify a route cause of a data error, incident, and/or service problem.

Additionally or alternatively, for example, in some embodiments, the event action circuitry 216 includes hardware, software, firmware, and/or a combination thereof, that utilizes machine learning model(s) to processes event-structured observability data for any of a myriad of purposes. Additionally or alternatively, for example, in some embodiments, the event action circuitry 216 includes hardware, software, firmware, and/or a combination thereof, that processes event-structured observability data to predict a data error, incident, and/or service problem determined as likely to affect a particular service, feature, and/or application. In some embodiments, the event action circuitry 216, alone or in combination with one or more other sets of circuitry such as the communications circuitry 208 and/or the input/output circuitry 206, causes rendering of one or more user interfaces, such as user dashboard interface(s), including any of a myriad of data associated with such initiated event-driven observability action(s). Additionally or alternatively, in some embodiments, the event action circuitry 216 includes hardware, software, firmware, and/or a combination thereof, that interacts with a corresponding user-facing application of a client device to facilitate such rendering, for example. It should be appreciated that, in some embodiments, the event action circuitry 216 may include a separate processor, specially configured field programmable gate array (FPGA), or a specially programmed application specific integrated circuit (ASIC), to perform such functionality.

It should be appreciated that, in some embodiments, one or more of the sets of circuitry 202-210 are combinable. Alternatively or additionally, in some embodiments, one or more of the sets of circuitry performs some or all of the functionality described associated with another set of circuitry. For example, in some embodiments, the event processing circuitry 210 is combined with the processor 202, such that the processor 202 performs one or more of the operations described above with respect to the event processing circuitry 210.

In some embodiments, any of the event-structured service 104, 106, and/or 108 as described herein with respect to FIG. 1 is embodied by one or more computing systems. In an example embodiment, an event-structured service, such as the event-structured service 104, 106, or 108, is embodied by the event-structured service apparatus 250 as depicted and described in FIG. 2B. The event-structured service apparatus 250 includes processor 252, memory 254, input/output circuitry 256, communications circuitry 258, service task circuitry 260, and service observability circuitry 262. In some embodiments, multiple event-structured service apparatuses communicate with one another to facilitate functionality embodying a feature of a particular software application.

It should be appreciated that the elements 252-258 may be embodied similar to that of the similarly named elements described with respect to FIG. 2B. For purposes of brevity and length of disclosure, duplicate description of such functionality is omitted. The event-structured service apparatus 250 may be configured, using one or more that sets of circuitry 252, 254, 256, 258, 260, and/or 262, to execute the operations described herein.

The service task circuitry 260 includes hardware, software, firmware, and/or a combination thereof, configured to support various aspects of event-structured service functionality provided by an event-structured service, such as one of the event-structured services 104, 106, and/or 108 as described herein. In some embodiments, the service task circuitry 260 utilizes processing circuitry, such as the processor 202 and/or the like, to perform one or more of such actions. For example, in some embodiments, the service task circuitry 260 includes hardware, software, firmware, and/or a combination thereof, that facilitates a particular software task associated with at least one feature of at least one application. It should be appreciated that any of myriad of software tasks may be facilitated by service task circuitry 260, including without limitation user authentication, session initiation, session management, inventory management, user interface generation, user interaction handling, and/or the like, or even a sub-task identified for any of the described tasks. In this regard, the service task circuitry 260 may initiate performance of such a task in response to operational engagement of the event-structured service apparatus 250 and/or the service task circuitry 260. In some embodiments, the service task circuitry 260 is operationally engaged by user-initiated interaction(s) and/or automatic interaction(s) associated solely with the event-structured service apparatus 250 and/or associated with interaction(s) with another event-structured service. In some embodiments, the service task circuitry 260 includes hardware, software, firmware, and/or the like, that interacts with a service repository to store data associated with the software task and/or retrieve stored data associated with the software task. It should be appreciated that, in some embodiments, the service task circuitry 260 may include a separate processor, specially configured field programmable gate array (FPGA), or a specially programmed application specific integrated circuit (ASIC), to perform such functionality.

The service observability circuitry 262 includes hardware, software, firmware, and/or a combination thereof, configured to support various aspects of observability functionality associated with an event-structured service, such as one of the event-structured services 104, 106, and/or 108 as described herein. In some embodiments, the service observability circuitry 262 utilizes processing circuitry, such as the processor 202 and/or the like, to perform one or more of such actions. For example, in some embodiments, the service observability circuitry 262 includes hardware, software, firmware, and/or a combination thereof, that facilitates collections and/or generation of one or more data streams to provide observability as described herein (e.g., linked observable data stream(s) or event-structured data stream(s)) associated with operational engagement of the event-structured service apparatus 250. In this regard, the service observability circuitry 262 collects and/or otherwise generates such data stream(s) associated with operational engagement associated with the software task(s) facilitated via the service task circuitry 260.

In some embodiments, the service observability circuitry 262 generates a linked observable data elements stream including any number of linked observable data elements. The linked observable data elements may each embody particular aspects associated with operations or other actions of the event-structured service. In some embodiments, the service observability circuitry 262 extracts, collects, and/or otherwise generates individual observable data elements embodying such actions of one or more event-structured services. Additionally or alternatively, in some embodiments, the service observability circuitry 262 injects one or more linking identifiers into one or more of the observable data elements to generate corresponding linked observable data elements to embody a linked observable data elements stream.

Additionally or alternatively, in some other embodiments, the service observability circuitry 262 collects and/or otherwise generates the event-structured data stream in a particular data format. The service observability circuitry 262 further includes hardware, software, firmware, and/or the like that provides event-structured observability stream(s) to one or more event-structured observability system(s) for processing. Additionally or alternatively, in some embodiments, the service observability circuitry 262 includes hardware, software, firmware, and/or a combination thereof, that performs any other event-based observability functionality as described herein.

It should be appreciated that, in some embodiments, one or more of the sets of circuitry 252-262 are combinable. Alternatively or additionally, in some embodiments, one or more of the sets of circuitry performs some or all of the functionality described associated with another set of circuitry. For example, in some embodiments, the service task circuitry 260 in combinable with the service observability circuitry 262 in a single set of circuitry. Alternatively or additionally, in some embodiments, the service task circuitry 260 and/or the service observability circuitry 262 is/are combined with the processor 252, such that the processor 252 performs one or more of the operations described above with respect to the service task circuitry 260 and/or service observability circuitry 262.

Example Computing Environments of the Disclosure

FIG. 3 depicts a visualization of an example computing environment for event-structured operability functionality in accordance with at least some embodiments of the disclosure. Specifically, the illustrated computing environment depicts interactions between computing elements and the data flow resulting therefrom. It should be appreciated that the specific computing elements and the data resulting therefrom is exemplary and is not limiting of the scope or spirit of the disclosure.

As depicted, the example computing environment includes a client 302 interacting with an event-structured service 304A. Such interactions operationally engage the event-structured service 304A to perform any of a number of tasks, processes, and/or the like. In this regard, the operational engagement caused by the interactions initiated via the client 302 associated with the event-structured service 304A results in the data stream 306A associated with such operational engagement. For example, the data stream 306A may embody a linked observable data stream or in other embodiments an event-structured data stream. In some embodiments, the data stream 306A includes a wealth of contextual data associated with the interactions associated with the event-structured service 304A. In some embodiments, for example, the data stream 306A includes data representing an identifier for the type of interaction initiated associated with the event-structured service 304A, a time such an action was initiated, a time such an action was terminated, an initiating user account identifier (in a circumstance where the interaction was triggered by user interaction), device information associated with the client 302, an application version identifier for a user-facing application executed via the client 302, and/or the like. It should be appreciated that the event-structured service 304A and/or client 302 may be configured to collect any determinable data value for including in a data stream, for example the data stream 306A.

In other embodiments, data streams result from operational engagement of the event-structured service 304A in response to interaction with another service. For example, in some embodiments, two event-structured services communicate with one another to facilitate a particular feature. Any event-structured service associated with such interaction(s) may collect, generate/and/or otherwise provide a data stream associated with such interaction(s). For example, in some embodiments, a linked observable data object is generated, collected, and/or the like, that includes linked observable data elements associated with a particular linking identifier to associate or otherwise "link" individual data representing aspects of the interaction performed by each of the event-structured services. In some such embodiments, each event-structured service may be configured to generate observable data elements representing aspects of the interaction(s) and/or inject linking identifier(s) into the observable data elements to generate the corresponding linked observable data objects before transmission in a linked observable data stream to the event-structured observability system 308.

The data stream 306A is received by the event-structured observability system 308 for further processing. In some embodiments, for example, the data stream 306A is collected, identified, and/or otherwise generated by the event-structured service 304A at least in response to operational engagement of the even-structured service 304A. The event-structured service 304A provides the data stream 306A to the event-structured observability system 308. In other embodiments, the client 302 collects, identifies, and/or otherwise generates the data stream 306A at least in response to the interactions with the event-structured service 304A. The client 302 subsequently provides the data stream 306A to the event-structured observability system 308. For example in some embodiments, the client 302 executes or otherwise utilizes a specially-configured user-facing application that enables such collection of the data stream 306A and/or provision of such data stream 306A to the event-structured observability system 308. In other embodiments, both the client 302 and event-structured service 304A provide data stream(s), and/or portions thereof, to the event-structured observability system 308.

The data stream 306A may be specially configured in particular format(s) for processing by the event-structured observability system 308. For example, in some embodiments, the data stream 306A is specially configured by client libraries accessible to the event-structured service 304A. The specially configured client libraries may extract and/or transmit the data stream 306A in a particular data format, for example defined by a particular data model for representing events associated with the event-structured service 304A. Alternatively or additionally, the specially configured client libraries may generate observable data elements based on actions performed by or associated with the event-structured service 304A, and/or inject particular linking identifier(s) to generate corresponding linked observable data elements representing events corresponding to one or more of such action(s). In some embodiments, in a circumstance where the event-structured service 304A performs an event including one or more sub-events, the event-structured service 304A or another service responsible for performing such sub-event(s) may inject a second or sub-linking identifier associated with the sub-event.

The event-structured observability system 308 processes the data stream 306A to generate a corresponding event-structured observability data 312A. In some such embodiments, the event-structured observability data 312A includes one or more portion(s) of the data stream 306A. Each portion may correspond to a particular event, a particular linking identifier, embody a different type of data (e.g., different types of linked observable data element(s)), and/or the like. Additionally or alternatively, in some embodiments, the event-structured observability data 312A includes data embodying one or more events extracted and/or otherwise identified from the data stream 306A. Each event includes or is based on at least some a portion of the contextual data embodied in the data stream 306A. For example, in some embodiments, each event Is identifiable in accordance with particular linking identifier(s) corresponding to one or more associated event(s). In some other embodiments, each event is identifiable in accordance with a particular structured event data format, for example such that the structure and/or payload of each event is the same for all event types configured to be identified and/or otherwise extracted by a particular event-structured observability system 308.

In some embodiments, the event-structured observability system 308 processes the data stream 306A to store data portions therefrom, and/or initiate one or more processing operations associated with the data stream 306A. For example, the event-structured observability system 308 may store some or all of the data stream 306A and/or monitor the data stream 306A. In this regard, the event-structured observability system 308 may embody or include an event-processing pipeline that processes the data stream 306A for performing such storing action(s), processing action(s), event-driven action(s), other observability-related action(s), and/or the like. In some such embodiments, the event-structured observability system 308 utilizes the relevant contextual data from the data stream 306A to store individual data portions associated with such events in accordance with particular structured event data format(s), for example in particular event data format(s) corresponding to event-structured data repositories for storing particular portions of the data stream 306A.

In some embodiments, the event-structured observability system 308 stores the event-structured observability data 312 in one or more event-structured observability data repositories, such as at least in the event-structured observability data repositories 314A. In the depicted embodiment, the event-structured observability system 308 stores the event-structured observability data 312, and/or particular portions thereof, based on the event(s) embodied by the event-structured observability data 312A. In some embodiments, for example, the event-structured observability data repositories 314A are determined to be used for storing the event-structured observability data 312A and/or portions thereof by the event-structured observability system 308. For example, the event-structured observability data repositories 314A may be determined or otherwise identified for use based on the cardinality and/or complexity of the event-structured observability data 312A to be stored. In this regard, various different types of data (e.g., raw data values, aggregated data values, and/or the like from the incoming data stream) may be stored in event-structured data repositories that enable efficient and effective storage and retrieval of such data. Additionally or alternatively, in some embodiments, the event-structured observability data 312A is stored based on the event(s) represented by the event-structured observability data 312A, contextual data associated therewith, types of interaction(s) that resulted in the corresponding data stream 306A, and/or the like. In some other embodiments, events of a first event type may be stored in a first event-structured observability data repositories 314A, and events of a second event type may be stored in a second event-structured observability data repository (not depicted).

In some embodiments, the event-structured observability system 308 stores various portions of event-structured observability data in different repositories that are designed to handle such data. For example, in some embodiments, the event-structured observability system 308 may aggregate and/or otherwise combine portions of the data stream 306A to generate at least a first portion of event-structured observability data 312A. The event-structured observability system 308A may store this aggregated data in a first event-structured observability data repository of the event-structured data repositories 314A that is configured to enable efficient retrieval of such aggregated data. Similarly, the event-structured observability system 308 may store the various raw data portions used for such aggregation as event-structured observability data in another event-structured observability data repository of the event-structured observability data repository 314A. For example, the event-structured observability system 308 may store the individual raw data portions in an event-structured observability data repository of the event-structured data repositories that is configured for efficiently handling high-cardinality and/or otherwise complex data. In this regard, the event-structured observability system 308 may leverage the different event-structured data repositories 314A to enable efficient and effective retrieval of processed and/or unprocessed data such that data particularly useful to a particular process (e.g., rendering dashboard, performing a determination, other event-driven observability action(s), and/or the like) may be efficiently identified and retrieved.

By storing the event-structured observability data 312A in an event-structured observability data repositories 314A, the various events embodied by event-structured observability data 312B are stored in a manner that enables expeditious performance user-submitted queries for such data at one or more levels of analysis. Such queries are performable efficiently and accurately based on the various events regardless of the actual query parameters upon which the user query for observability data is based. In this regard, utilizing such queries, a user may "slice" the various aspects of events based on any of a plurality of data properties embodied therein (e.g., viewing aggregated data for a particular event, or particular individual data portions, or the like). The event-structured nature of the data enables the specific queries to be determined after data collection, and without requiring configuration of the event-structured service 304A and/or the event-structured observability system 308 in advance for collecting and/or extracting data specific to the particular query.

Specifically, for example, in some embodiments the event-structured observability system 308 includes or embodies an event processing pipeline that processes the data stream 306A for storing and/or processing via one or more event-driven action(s). The event processing pipeline, for example, may perform the aggregation and/or combination of one or more data portions (e.g., all metrics associated with a particular span identifier or span identifier(s), all logs associated with a particular span identifier or span identifier(s), and/or the like) before storing such processed data in one or more event-structured data repositories 312A. Alternatively or additionally, the event processing pipeline may include one or more specially configured sub-process(es) and/or component(s) that extract particular data portions from the data stream 306A for storing as event-structured observability data in one or more event-structured data repositories 314A.

For example, the event-processing pipeline may extract all metrics data associated with one or more particular span identifier(s) individually and store such data individually to a first event-structured observability data repository separate from a second event-structured observability data repository associated with storing aggregated metrics and/or separate from a third event-structured observability data repository associated with storing individual trace data, for example. It should be appreciated that the particular event-structured data repositories 314A utilized and the particular data stored in each may depend on the level of analysis to be provided via querying and/or processing of the data stored to such event-structured data repositories 314A. In this regard, utilizing various event-structured data repositories 314A that store different data and/or levels of processed data enables such data to be efficiently identified and utilized for handling a majority of likely future user queries for observability data at varying levels of analysis.

Additionally or alternatively, in the depicted embodiment, the event-structured observability data 312A is further utilized, in real-time and/or upon subsequent retrieval by the event-structured observability system 308 from the event-structured observability data repositories 314A, for further processing. In some embodiments, for example, the event-structured observability system 308 processes the event-structured observability data 312A to initiate one or more event-driven observability action(s) based on the event-structured observability data. In this regard, new data representing events occurring in real-time or near real-time (e.g., within a desired threshold timestamp interval) are utilizable in any of such event-driven observability action(s). For example, in some embodiments, the real-time event(s) represented by the event-structured observability data 312A may immediately be queried for purposes of performing a user query for observability data, and/or stored and later retrieved from the event-structured observability data repositories 314A for purposes of facilitating such a query. Alternatively or additionally, the event-structured observability system 308 may utilize the event-structured observability data 312A by processing the event(s) embodied therein to identify a root cause of one or more data errors associated one or more systems, services, and/or platforms, for example the event-structured service 304A, and/or to predict data faults associated with one or more systems, services, and/or platforms based on the events embodied by the event-structured observability data 312A, for example the event-structured service 304A.

It should be appreciated that in some embodiments, event-based operability functionality is provided for any number of platforms, services, and//or systems. For example, as illustrated, the client similarly interacts with event-structured service 304B. The interactions associated with the event-structured service 304B, for example in response to interactions initiated via the client 302, result in data stream 306B that is provided to the event-structured observability system 308. The event-structured observability system 308 similarly processes the data stream 306B to generate event-structured observability data 312B.

It should be appreciated that the events represented by the data of the event-structured observability data 312B may differ from that of the event-structured observability data 312A based on the differences in the contextual data associated with the operational engagement of the event-structured service 304B. The event-structured observability data 312B is similarly stored in one or more event-structured observability data repositories. For example, in some embodiments, the event-structured observability data 312B is stored in the same event-structured observability data repositories 314A based on one or more determinations performed via the event-structured observability system 308. In other embodiments, the event-structured observability data 312B is stored in a different event-structured observability data repository, for example determined based on corresponding event-structured service 304B, event types for the events extracted and/or otherwise identified from the data stream 306B, and/or the like.

In some embodiments, for example as depicted, the data stream 306B for interactions associated with the event-structured service 304B is identified by, generated by, and/or processed by a sidecar process 350 associated with the event-structured observability system 308. In some such embodiments, the sidecar process 350 is configured to ingest data stream(s), such as the data stream 306B, based on monitored and/or detected interactions associated with the event-structured service 304B, or received data associated therewith. In this regard, the sidecar process 350 is separate from and does not interfere with a primary operation of the event-structured observability system 308 and/or event-structured service 304B.

FIG. 4 depicts a system architecture diagram of an example event-structured observability system, such as the event-structured observability system 102, configured for event-structured operability functionality in accordance with at least some embodiments of the disclosure. Specifically, the illustrated, the system architecture diagram depicts detailed interactions between computing systems of an example event-structured observability system 452 and the data flow resulting therefrom, utilizing specific exemplary services and systems as concrete examples. It should be appreciated that the specific computing services, systems, and/or other elements and the data resulting therefrom are exemplary and are not limiting of the scope or spirit of the disclosure.

In some embodiments, one or more computing sub-systems depicted and described with respect to FIG. 4 are located in distinct regions from one another. In this regard, the event-structured observability system 102 may perform any number of determinations for processing network traffic. For example, in some embodiments, the data stream for interactions from a particular client and/or event-structured service are processed by computing sub-systems within the same region as the client and/or event-structured service. Additionally or alternatively, in some embodiments the computing sub-systems of the event-structured observability system 452 route data for processing in a smart manner that maintains the presence of the data processing in desired region(s).

The example event-structured observability system 452 collects and/or otherwise receives data stream(s) (e.g., linked observable data stream(s) and/or event-structured data stream(s)), and/or portions thereof, via receiver service(s) 408. As illustrated, for example, the receiver service(s) 408 collect and/or otherwise receive a plurality of types of data embodying data stream(s) and/or portion(s) thereof. For example, a data stream received by one or more of the receiver service(s) 408A includes mobile data 402A, browser data 402B, and lambdas data 402C. Each of the mobile data 402A, browser data 402B, and lambdas data 402C serves as contextual data for one or more interaction(s) performed associated with a particular event-structured service. In this regard, the mobile data 402A, browser data 402B, and lambdas data 402C each may be associated with an interaction performed automatically by an event-structured service, an interaction performed in response to initiation by a client device, and/or the like. Similarly, it should be appreciated that the mobile data 402A, browser data 402B, and lambdas data 402C may include information regarding the event-structured service, information regarding the event-structured service providing or otherwise embodying the event-structured service, information regarding the client device, information regarding one or more applications of the client device (e.g., user-facing application(s) utilized to interact with the event-structured service), and/or the like.

As depicted, the receiver service(s) 408A collect or otherwise receive such information, at least in part, utilizing event-structured observability client libraries 406. In some embodiments, for example, the event-structured observability client libraries 406 are provided for integration into event-structured service(s) to enable the identification and/or collection of information to be provided as part of a data stream for a particular event-structured service. In some such embodiments, the event-structured observability client libraries 406 are provided associated with the event-structured observability system 452 to enable such integration with the event-structured service.

In some embodiments, the event-structured observability client libraries 406 in some embodiments includes a specially configured software application library (e.g., an application programming interface) that provide functionality utilizing various computer programming languages. In some embodiments, the event-structured observability client libraries 406 generate and/or cause transmission of one or more linked observable data stream(s) embodying observability data associated with one or more events. For example, in some embodiments, the event-structured observability client libraries 406 are configured to generate observable data elements corresponding to interactions performed by or associated with a particular event-structured service. The observable data elements may embody metrics data, logs data, and traces data associated with such interaction(s). Additionally or alternatively, the event-structured observability client libraries 406 may generate one or more linking identifier(s) associated with such event(s) and inject one or more linking identifiers into the observable data elements to generate corresponding linked observable data elements.

In some embodiments, the event-structured observability client libraries 406 are further configured to generate sub-linking identifiers for sub-events of a particular event that are performed by the same event-structured service, and/or propagate linking identifiers for use by another event-structured service in generating other linked observable data elements for the same event or sub-events associated therewith. Such linked observable data may be identifiable as associated with particular event(s) based on sharing one or more linking identifiers. It should be appreciated that the event-structured observability client libraries 406 may be configured to automatically monitor interactions performed by one or more event-structured service(s) for purposes of generating corresponding linked observable data element(s) and/or transmitting linked observable data element streams including any number of such linked observable data element(s) for further processing.

In this regard, the correct event-structured observability client library of the event-structured observability client libraries 406 for integration with a particular event-structured service is available to developer(s) for integration with their computing service to configure the computing service as an event-structured service. In some embodiments, each of the event-structured observability client libraries 406 is specially configured such that individual functions of the event-structured observability client libraries do not require further configuring by each individual computing service for use, such that a particular event-structured observability client library may be immediately integrated upon inclusion into the event-structured service.

Additionally or alternatively, in some embodiments, the example event-structured observability system 452 collects and/or otherwise receives data stream(s), and/or portions thereof, via receive sidecar process(es) 408B. As illustrated, for example, the sidecar process(es) 408 collect and/or otherwise receive a plurality of types of data embodying data stream(s) and/or portions thereof for particular types of event-structured service(s). In this regard, one or more event-structured observability client libraries of the event-structured observability client libraries 406 is specially configured for integration into any specific type of event-structured service. For example, as depicted, the event-structured observability client libraries 406 enable collection and/or otherwise receiving, by sidecar process(es) 408B, of event-structured stream data for non-platform-as-a-service service 404A, platform-as-a-service services 404B, platform infrastructure services 404C, and/or host agents 404D.

In this regard, the computing service types 404A-404D are each associated with an event-structured observability client library of the event-structured observability client libraries 406 that is configured to enable implementation and/or use of one or more sidecar process(es) 408B to collect such event-structured stream data. In some such embodiments, such service(s) utilize specific event-structured observability client libraries because other event-structured observability client libraries utilized for other computing service types (e.g., implementing another known system architecture) would not function for the various service types depicted and described with respect to 404A-404D. It should be appreciated that the sidecar process(es) 408B in some embodiments are configured to collect and/or otherwise identify the same event-structured stream data as described with respect to the receiver service(s) 408A. In some embodiments, for example, the sidecar process(es) 408B are configured to collect and/or otherwise identify mobile data 402A, browser data 402B, lambdas data 402C, and/or equivalent data values for the corresponding computing service type.

The example event-structured observability system 452 further includes ingestion service 410. The ingestion service 410 intakes and/or otherwise receives the event-structured stream data from the receiver service(s) 408A and/or the sidecar process(es) 408B. In some embodiments, the ingestion service 410 performs any of a number of data preprocessing operations associated with determining whether data from a service is to be processed. For example, the ingestion service 410 in some embodiments performs authentication and/or authorization of incoming data payloads from the receiver service(s) 408A and/or sidecar process(es) 408B, for example to determine whether the service is allowed to send data payloads for processing. Additionally or alternatively, in some embodiments, the ingestion service 410 performs rate limiting of incoming data from one or more service(s) (e.g., from the receiver service 408A and/or sidecar process 408B). Additionally or alternatively still, in some embodiments, the ingestion service 410 performs routing functionality associated with incoming data streams, for example publishing and load balancing incoming data onto streaming pipeline buffers (e.g., embodied by AWS Kinesis or an equivalent, for example).

The example event-structured observability system 452 further includes event-structured processing pipeline 414. The event-structured processing pipeline is configured to process the data received from the service(s), for example data stream(s) representing events initiated by or associated with an event-structured service. In some such embodiments, the event-structured processing pipeline 414 is configured to process the particular relevant portions of the data stream for each identified event. In this regard, the event-structured processing pipeline 414 performs determinations based on the data stream(s) and/or stores some or all of the data stream(s) for further querying and/or processing.

In some embodiments, for example, the data stream(s) output by the ingestion service 410 include Kinesis data stream(s) specially configured via Amazon web services provided by Amazon.com, Inc of Seattle, Wash. In some such embodiments, the event-structured processing pipeline 414 includes and/or leverages use of a Kinesis data analytics (KDA) processor 416A and a Kinesis client library (KCL) processor 416B, both similarly specially configured via Amazon web services provided by Amazon.com, Inc. of Seattle, Wash.

The KDA processor 416A is specially configured to retrieve and process the data stream(s) and publish the processed data (e.g., event-structured observability data) for subsequent processing in a next stage of the pipeline. For example, in some embodiments, the KDA processor 416A retrieves batch(es) of data from a streaming pipeline buffer, for example AWS Kinesis, for processing. The KDA processor 416A processes the retrieved batch(es) of data in a defined manner before publishing the processed data. In some embodiments, the processed data is published as event-structured observability data for processing for storage and/or monitoring. In some embodiments, for example, the processed data (e.g., embodying event-structured observability data) is outputted for processing via SignalFx instance 418A, an implementation of SignalFx provided by Splunk Inc. of San Francisco, Calif. that performs software-as-a-service based metrics solution(s). In this regard, the KDA processor 416A may be specially configured to process and publish the event-structured observability data for any of a myriad of functions provided via the SignalFx instance 418A. For example, the KDA processor 416A may perform defined processing actions that include statistical metric aggregation and filtering of excess, high-cardinality metadata. Additionally or alternatively, in some embodiments, the KDA processor 416A publishes the processed data for storing via a storage data sink, such as via a Splunk cluster. In some embodiments, the KDA processor 416A processes the event-based data stream to perform data transformation for storage, and/or routing of the processed data to specific Splunk clusters and/or instances for storing. In this regard, for example, the KDA processor 416A in conjunction with the SignalFx instance 418A may be configured to provide real-time data stream processing functionality, for example for purposes of causing dashboard rendering, error root cause identification, user querying, and/or the like.

In some embodiments, each sub-system receives, extracts, and/or processes particular data. For example, in some embodiments, the SignalFx instance 418A receives metrics extracted from the data stream(s) for use. Additionally or alternatively, the Lightstep instance 418D may receive traces extracted from the data stream(s) for use. Such data may subsequently be queried for use in providing one or more observability action(s) as described herein.

The KCL processor 416 is optionally provided to perform similar functions associated with data processing and/or publishing, for example to enable such processes with reduced complexity of implementation as compared to the KDA processor 416A. The KCL processor 416B processes the event-structured observability data for storing in one or more event-structured observability data repositories, and/or for processing by data analysis tools associated therewith. In some embodiments, for example, the KCL processor 416B processes the event-structured observability data for storing in the Splunk repository 418B and high-cardinality, high-fidelity bucket 418C. In some such embodiments, the Splunk repository 418B is associated with a SmartStore instance 420B that enables storage of event-structured observability data in a remote and/or cloud environment, for example the Splunk repository 418B implemented on Amazon web services hosted computing systems. The Splunk repository 418B similarly utilizes an instance of Splunk Deep Fabric Search (DFS) with Apache Spark 420A to enable interaction with one or more of the event-structured data repositories. For example, in some embodiments, the instance of Splunk DFS with Apache Spark 420 embodies a query engine that may be utilized to query and process large data sets from the event-structured data repositories. For example, in some embodiments, the instance of Splunk DFS with Apache Spark 420 enables querying and/or other interaction with the high-cardinality, high-fidelity bucket 418C. In this regard, the Splunk repository 418B may store event-based observability data from the KDA processor 416A and/or KCL processor 416B in a first format including values for certain data properties that are generally lower cardinality than the data properties stored via the high-cardinality, high-fidelity bucket 418C associated therewith. In this regard, the various components are each configured and utilized in initiating one or more event-driven observability actions.

In some embodiments, various event-structured data repositories store the same data, or portions thereof, published by the KDA processor 416A and/or KCL processor 416B. Each event-structured observability data repository may be configured and/or embodied differently to enable different use cases, retention of data for different use cases and/or timestamp interval(s), and/or the like. In this regard, each event-structured observability data repository may be accessed and/or otherwise utilized for a specific use case of storing and/or querying the stored data, for example to manage tradeoffs between the functionality of each event-structured observability data repository with respect to use case, query execution efficiency, data storage cost, and/or data query cost. For example, in some embodiments, Splunk index clusters and/or Splunk SmartStore are utilized to provide short and/or medium term retention event-structured observability data. In some such embodiments, the data is sampled. Such implementations may enable querying of the associated data quickly and/or efficiently, and/or with a relatively low cost. Alternatively or additionally, in some embodiments, the high-cardinality, high-fidelity bucket 418C provides long-term retention with slower query capabilities. The data associated with the high-cardinality, high-fidelity bucket 418C may be stored for a longer time of retention, and may be queried slower than corresponding event-structured data repositories (e.g., Splunk SmartStore). In some such embodiments, the data to be stored to the high-cardinality, high-fidelity bucket 418C is not sampled. Such implementations may enable querying over the longer retention period with a higher cost and higher query execution times as compared to use of the shorter-retention Splunk SmartStore.

In some embodiments, as depicted, the event-structured observability system control plane 412 configures one or more of the components described. For example as depicted, the event-structured observability system control plane 412 may be utilized, in some embodiments, to configure the ingestion service 410 to process the data stream(s) in in a particular data format, to configure the KDA processor 416A to produce a desired data format of event-structured observability data for processing via the SignalFx instance 418A, to configure the Splunk repository 418B for storing particular event-structured observability data and/or store such data in a particular data format, and/or to configure the KCL processor 416B to output data in desired data format(s) for example for use by each of the components 418B-418D. In this regard, in some embodiments, the event-structured observability system control plane 412 provides administrators and/or other users of the event-structured observability system 452 control to dynamically configure such components to ensure functionality of the event-structured observability system as desired.

Alternatively or additionally, in some embodiments, the event-structured observability system 452 enables configuration of one or more of such components by a user of the event-structured observability system 452. For example, in some embodiments, the user device 454 is associated with a user configuring the event-structured observability system for use in providing event-based observability functionality associated with one or more particular computing service(s). In this regard, the user of the user device 454 may interact with the event-structured observability system to configure 426 one or more aspects and/or components thereof. For example, as depicted, the user, via the user device 454, may configure various aspects of the Lightstep instance 418D, Splunk repository 418B, and/or SignalFx instance 418A to enable such instances to function in a particular desired manner with respect to the one or more particular computing services integrated as event-structured services.

Additionally or alternatively, in some embodiments, the event-structured observability system 452 initiates and/or otherwise executes various event-driven observability action(s). For example, as depicted, the event-structured observability system 452 includes a process that produces default alarms 422A. In some embodiments, the default alarms 422A embody data-driven determinations based on event-structured observability data that indicate one or more ongoing and/or predicted data errors, high latency, and/or the like. Additionally or alternatively, in some embodiments, the default alarms 422A includes information identifying a root cause of the alarm and/or the like. In some embodiments, the SignalFx instance 418A is utilized to process the event-structured observability data for generating one or more of the default alarms 422A. Similarly, for example as depicted, the event-structured observability system 452 includes a process that produces default dashboards 422B.

In some embodiments, the default dashboards 422B embody visualizations of event-structured observability data, queries thereof, and/or data derived therefrom for viewing by a user. In this regard, a user may interact with the default dashboards 422B to view event-structured observability data associated with one or more event-structured services and/or otherwise analyze such event-structured observability data for purposes of data observability. In some such embodiments, the user device 454 accesses the event-structured observability system 452 to access such default alarms 422A and default dashboards 422B via the user device 454. In this regard, the event-structured observability system 452 may provide information to the user device 454 that represents and/or otherwise causes rendering of information embodying the default alarms 422A and/or default dashboards 422B. Such information may be provided upon user access associated with one or more specific user accounts. For example, in some embodiments, the event-structured observability system 452 maintains user accounts associated with particular event-structured services, such that the event-structured observability system 452 makes available event-structured observability data and/or corresponding event-based observability functionality associated with that event-structured service upon authentication of the user device 454 as having access to the user account associated with such event-structured service (e.g., by authentication of user authentication credentials and initiation of an authenticated session linked to the user device 454).

FIG. 5 illustrates an example visualization of event-driven observability actions configured to be initiated as event-based observability functionality by a particular event-structured observability system in accordance with at least some embodiments of the present disclosure. It should be appreciated that the example event-driven observability actions depicted and described are exemplary and not intended to limit the scope and/or spirit of the disclosure. In yet some other embodiments, an event-structured observability system is configured to initiate an event-driven observability action embodying any user-desired data-driven determination based on event-structured observability data associated with one or more event-structured service(s).

As depicted, the event-structured observability system is configured to perform and/or utilize an event-driven observability actions process 502 that interacts with one or more of the event-structured observability data repositories 504A-504D (collectively "event-structured observability data repositories 504"). The event-driven observability actions process 502 may embody any event-driven observability action that processes a data stream and/or event-structured observability data embodying stored portions of one or more previously received data stream(s). In this regard, event-driven observability action(s) may be performed in real-time or near real-time (e.g., within seconds, or in some circumstances under a minute depending on complexity of the initiated event-driven observability action) with respect to the performed event(s) that lead to collection of the corresponding data. Alternatively or additionally, in this regard, event-driven observability action(s) may similarly be performed well after the collection of such data, for example to retroactively diagnose and/or remediate problems identified after such problems have occurred, in response to user-submitted observability queries for data over an extended period of time, and/or the like. Event-driven observability actions may be performed outside of or otherwise after a real-time period in a circumstance where such event-driven observability actions are performed hours, days, weeks, months, or years after the data collection and/or events resulting in the collection of corresponding data streams. It should be appreciated that particular event-driven observability actions, such as particularly targeted user queries, processing of real-time data streams to detect particular events and provide corresponding alert(s), and/or the like, may be performed in real-time, whereas other event-driven observability events such as user queries for observability data over a significant period of time (e.g., days, months, years, and/or the like) may require performance after a real-time period due to constraints on computing resources and/or execution speed to complete the event-driven observability action.

It should be appreciated that, as described herein, each of the event-structured observability data repositories 504 enables interaction is configured to store event-structured observability data and/or portion(s) thereof. In some embodiments, each of the event-structured observability data repositories 504 stores different portions of event-structured observability data, and/or stores event-structured observability data in different formats to enable processing of certain event-driven observability actions that utilize such particular event-driven observability data to be performed in a desired time interval. For example, low-cardinality and/or other quickly processable event-structured observability data may be stored in event-structured observability data repository 504A for use in real-time event-driven observability action(s) that are efficiently performed based on such data, and/or high-cardinality and/or other event-structured observability data requiring longer processing times may be stored in an event-structured observability data repository 504D in a different format and utilized for other event-driven observability actions that utilize such data. For example, in some embodiments detect and alert output 510A may embody a first event-driven observability action that utilizes data at a first level and stored to a first event-structured observability data repository (e.g., aggregated data stored in 504A) whereas machine learning output 510F may embody a second event-driven observability action that utilizes data at a second level and stored to a second event-structured observability data repository (e.g., high-cardinality data stored in 504D).

The event-driven observability actions process 502 embodies one or more software processes that perform one or more event-driven observability actions. For example, in some embodiments, the event-driven observability actions process 502 embodies a process associated with an event-driven observability action that detects data errors and/or other service problems (e.g., database access latency problems) and generates alert(s) associated with such data error(s) and/or service problem(s). As depicted, for example, the event-driven observability actions process 502 generates detect and alert output 510A that represents the detected data errors and/or service problems (if any), and/or alerts corresponding therewith for providing to a user.

Additionally or alternatively, for example, in some embodiments, the event-driven observability actions process 502 embodies a process associated with an event-driven observability action that visualizes and/or monitors event-structured observability data associated with one or more event-structured service(s). As depicted, for example, the event-driven observability actions process 502 generates visualization & monitor output 510B that represents user interface(s), dashboard(s), and/or the like, and/or monitoring data associated with that data (e.g., trends, changes, and/or the like) for providing to a user.

Additionally or alternatively, for example, in some embodiments, the event-driven observability actions process 502 embodies a process associated with an event-driven observability action that investigates event-structured observability data and/or errors derived therefrom, and/or triages portions of an event-structured service indicated as experiencing data error(s) and/or service problem(s) based on the event-structured observability data associated with the event-structured service. As depicted, for example, the event-driven observability actions process 502 generates investigate and triage output 510C that represents such information associated with investigation and triage based on such event-structured observability data processing for providing to a user.

Additionally or alternatively, for example, in some embodiments, the event-driven observability actions process 502 embodies a process associated with an event-driven observability action that correlates event-structured observability data. For example, in some embodiments, the event-driven observability action correlates specific portions of event-structured observability data that represent relationships and/or identified patterns for various metrics, metadata, and/or the like. The correlation may indicate information, services, and/or the like that are linked together as dependent, associated with detected data error(s) and/or service issue(s), and/or the like. As depicted, for example, the event-driven observability actions process 502 generates correlate output 510D that represents determined correlations between event-structured observability data for providing to a user. In one particular example context, for example, the correlate output 510D represents a determination that a first event-structured service (e.g., service A) relies on a second event-structured service (e.g., service B) as a dependent based on the event-structured observability data associated with service A, such that an increase in the error rate in service B may be correlated with a subsequent increase in the error rate in service A. Such correlations may be identified automatically and/or manually by one or more users.

Additionally or alternatively, for example, in some embodiments, the event-driven observability actions process 502 embodies a process associated with an event-driven observability action that identifies a root cause of one or more data error(s) and/or service issue(s) identified by event-structured observability data for a particular event-structured service. As depicted, for example, the event-driven observability actions process 502 generates root cause identification output 510E that represents an identified portion of an event-structured service identified as a root cause of one or more data error(s) and/or service problem(s) for providing to a user.

Additionally or alternatively, for example, in some embodiments, the event-driven observability actions process 502 embodies a process associated with an event-driven observability action that utilizes machine learning for event-structured observability determinations and/or functionality. As depicted, for example, the event-driven observability actions process 502 generates machine learning output 510F that represents data outputs of any machine learning models that utilize event-structured observability data for data error and/or service problem detection and/or processing, data error and/or service problem prediction, and/or the like, for providing to a user. Machine learning models may be utilized for any of a myriad of use cases, including utilizing machine learning for performing another of the event-driven observability action(s) as described herein. For example, one or more machine learning model(s) may be implemented for performing fault prediction and/or automatic root cause identification. In this regard, the machine learning model(s) may be trained to model potential causes of incidents for services (e.g., errors and/or the like), where the root cause exists outside of the explicit dependencies between service(s).

Additionally or alternatively, for example, in some embodiments, the event-driven observability actions process 502 embodies a process associated with an event-driven observability action that identifies one or more data error(s) and/or service problem(s) predicted to effect one or more event-structured service(s) based on event-structured observability data associated therewith. As depicted, for example, the event-driven observability actions process 502 generates fault prediction output 510G embodying data that represents identified data errors and/or service problem(s) for providing to a user.

Example Data Format of Linked Observable Data Elements Stream of the Disclosure FIG. 6A depicts a visualization of data formatted in accordance with a first data format of a linked observable data stream in accordance with at least some example embodiments of the present disclosure. Specifically, FIG. 6A depicts event-structured data stream 602 comprising specially configured metric data 604A, log data 604B, and trace data 604C.

Each of the metric data 604A, log data 604B, and/or trace data 604C may be collected and/or otherwise generated by one or more specially configured client libraries. In this regard, the metric data 604A, log data 604B, and/or trace data 604C may be generated in response to particular interactions performed via an event-structed service. For example, as an event-structured service receives a request to perform a task, performs a task, or outputs a request to perform a task, one or more of metric data 604A, log data 604B, and trace data 604C may be collected.

It should be appreciated that, in some embodiments, only a portion of metric data 604A, log data 604B, and trace data 604C is generated for a particular interaction. For example, in some circumstances, a particular interaction of an event-structured service may result in metric data 604A only, or log data 604B and trace data 604C only, or metric data 604A and trace data 604C only. In other circumstances, each of metric data 604A, log data 604B, and trace data 604C is generated and/or otherwise collected for a particular interaction of an event-structured service. The generation of particular metric data 604A, log data 604B, and trace data 604C may depend on the instrumentation of the corresponding event-structured service(s). In some embodiments, the linked observable data stream 602 is configured to conform to the OpenTelemetry framework. In this regard, the metric data 604A, log data 604B, and trace data 604C may include at least each of the data properties set forth by the OpenTelemetry framework.

Additionally or alternatively, each of the metric data 604A, log data 604B, and trace data 604C may include additional data properties to enable the event-based observability functionality described herein. For example, in some embodiments, the metric, log, and trace data may be with one or more data identifier(s) that links or otherwise associates each of the data objects with one another. As illustrated, for example, the metric data 604A, log data 604B, and trace data 604C are each associated with a span identifier 606. The span identifier 606 may be generated associated with the particular interaction initiated and/or performed by the event-structured service. In this regard, the span identifier 606 and/or particular portions thereof may be utilized to identify particular metric data 604A, log data 604B, and trace data 604C that embody a particular detected event associated with or otherwise representing an interaction of an event-structured service.

A span identifier 606 may include or otherwise be associated with one or more parent span identifier(s) and/or one or more sub-span identifier(s). For example, in a circumstance where a particular interaction includes one or more sub-interactions to be performed by the same event-structured service and/or another event-structured service, the span identifier associated with the current interaction may be propagated for association with one or more other span identifiers. In this regard, the span identifier associated with a subsequent interaction by the same or another event-structured service may include or otherwise be associated with the span identifier(s) of previous interaction(s). It should be appreciated that the span identifier 606 may include or be associated with one or more other span identifiers associated with such other interaction(s). For example, the span identifier 606 may include one or more sub-identifiers associated with parent interaction(s) associated with the metric data 604A, log data 604B, and trace data 604C.

In an example context, specially configured client libraries executing on the event-structured service, for example, may inject particular span identifiers into the metadata of portions of the linked observable data stream generated while executing a particular interaction associated with a particular span. For example, when span 1 is created for a particular interaction, any metric data, log data, and/or trace data generated before completion of span 1 may have span 1 injected into its metadata to indicate that it is associated with or otherwise part of the data relevant to the interaction and/or event corresponding to span 1. Furthermore, in some embodiments, where a second span 2 is generated as a sub-task of completing span 1, both span 1 and span 2 may be injected into the metadata of subsequently generated metric data, log data, and/or trace data until completion of span 2. In this regard, the span identifiers in the metadata of each data portion may be utilized to link otherwise separate data portions, and in this manner various otherwise separate data portions may be grouped and/or analyzed with respect to a particular event.

The linked observable data stream 602 may be processed and/or stored in various portions. For example, in some embodiments, each of the metric data 604A, log data 604B, and trace data 604C are stored in different repositories associated with the cardinality and/or storage time for said data. In this regard, the individual metric data 604A, log data 604B, and trace data 604C associated with a particular event may be retrieved from said repositories based on the linked and/or associated span identifier(s). Additionally or alternatively, particular metric, log, and trace data associated with a particular event may be identified and processed accordingly. For example, the metric data 604A, log data 604B, and trace data 604C may be identified and/or retrieved from such repositories based on the span identifier 606, and processed for purposes of one or more event-driven action(s) (e.g., to provide one or more dashboard(s), make one or more determination(s), generate one or more prediction(s), and/or the like).

Example Alternative Data Formats of Event-Structured Data Stream of the Disclosure FIG. 6B depicts data formatted sub-events of an alternative example format of event-structured observability data 652. In this regard, the data format depicted in FIG. 6B may operate as an alternative to the metrics, logs, and traces format depicted and described with respect to FIG. 6A. It should be appreciated that the example sub-events of the event-structured observability data 652 are exemplary and not to limit the scope and spirit of the disclosure.

As depicted, the event-structured observability data 652 includes various formatted event information 654A-654K (collectively "event information 654"). In some embodiments, the various event information 654 each embody at least a portion of data that may be embodied in an event-structured data stream, for example as an event type payload associated with particular event types instrumented associated with a particular event-structured service or plurality of event-structured service(s). The various different event information 654 may each be associated with different context data corresponding to a particular event type or plurality of event types. In this regard, certain event information is specific to particular event types, for example datastore query information 654J may be received for a particular event type (e.g., a database query event) that is mutually exclusive from outgoing HTTP request information 654H that may be received for a second particular event type (e.g., an outgoing HTTP request). Thus, an event-structured data stream that includes an event payload having outgoing HTTP request information 654H, for example, may be identified as representing an outgoing HTTP request rather than another type of event, and may be processed accordingly.

Other event information, such as the cloud environment information 654D, may be included in a plurality of event types, for example an outgoing HTTP event, an incoming HTTP event, a database query event, and/or the like. It should be appreciated that, in this regard, the event information of the event information 654 that is present in an event payload of an event-structured data stream may include various sub-portions of the event information 654 dependent on the type of event represented in the event-structured data stream. In other embodiments, additional and/or alternative event information not depicted may be collected and/or otherwise received. The event-structured observability system may process the event-structured data stream(s) it receives to understand what data conforms to the data model representing one or more particular event types, and detect such events of particular event types from the event-structured data stream from the received event information represented in the event-structured event stream(s).

An event-structured observability system may be configured to enable collection and/or receiving of such data in response to interactions associated with a particular event-structured service. For example, in some embodiments, the event-structured observability system provides and/or is associated with event-structured observability client libraries that facilitate collection and/or identification of event-structured data stream(s) including such information for processing into each of the event information 654. In this regard, for example, a specially configured event-structured processing pipeline may generate the event information 654 from the event-structured data stream(s) received and/or collected, for example utilizing event-structured observability client libraries together for a particular event-structured service.

As depicted, the event-structured observability data 652 includes event metadata information 654A, logical environment information 654B, authenticated/authorization mechanism information 654C, cloud environment information 654D, incoming HTTP request information 654E, outgoing HTTP request information 654F, identity/tenant information 60G, filter processing information 654H, scheduled job information 654I, datastore query information 654I, and feature flags information 654K. It should be appreciated that, in some embodiments, event-structured observability data 652 includes only one or some of the event information 654 based on interaction(s) executed associated with a particular corresponding event-structured service. For example, in some embodiments, incoming HTTP request information 654E is received and/or processed in response to an executed HTTP request interaction via the associated event-structured service and/or interaction between the event-structured service and another event-structured service. Similarly, in some embodiments, datastore query information 654I is received and/or processed in response to a database query interaction executed via the associated event-structured service.

FIG. 6C depicts example contextual data associated with and/or embodying particular events associated with of the event information 654. Specifically, for example, in some embodiments, event information associated with each event type is specifically formatted to include particular contextual information relevant to the corresponding event type. In this regard, it should be appreciated that other event information may include and/or otherwise be associated with different contextual data embodying and/or associated with that particular sub-event. Indeed, the example data depicted and described with respect to FIG. 6C is exemplary and not to limit the scope and/or spirit of the disclosure.

The particular contextual data associated with each event information and/or event type may be defined manually by one or more users. For example, in some embodiments, the particular contextual data associated with a particular event information and/or event type is defined by one or more developers (e.g., a developer of an event-structured service to be instrumented for event-structured data observability as described herein) and/or subject matter expert(s) (e.g., observability experts associated with the event-structured observability system). In this regard, the user(s) may define the particular metadata, metrics, properties, and/or other data collected associated with each particular event type relevant and/or to be monitored for one or more particular event-structured service(s). In other embodiments, the context data associated with event information for one or more particular event type(s) is automatically determined utilizing one or more statistical model(s), machine learning model(s), and/or the like.

As depicted, the cloud environment information 654D sub-event includes values for the contextual data properties 672A. Specifically, the contextual data properties 672A includes a cloud provider value, a region value, an availability zone value, and a host identifier value. Similarly, as depicted, the incoming HTTP request information 654E sub-event includes values for the contextual data properties 672B. Specifically, the contextual data properties 672B includes a URL value, a requested URL value, a request method value, a request status code value, a user agent value, and a response time value. It should be appreciated that, in other embodiments, the contextual data properties 672A and/or 672B include one or more other data properties determined and/or otherwise considered relevant for event-based observability functionality. For example, in some embodiments, another contextual data property is included that is determined and/or otherwise indicated as likely to be utilized by a user in performing a user query for observability data, and/or utilized in one or more determinations associated with identifying, triaging, and/or predicting data error(s) and/or service problem(s) associated with a particular event-structured service.

In this regard, the values for the contextual data properties 672A may be extracted from and/or otherwise identified from event-structured data stream(s) received from and/or otherwise associated with the event-structured service. For example, in this regard, an incoming HTTP request performed via an event-structured service is associated with and/or includes contextual data utilized in event-structured data stream(s) that include all relevant contextual data associated with the incoming HTTP request. Such event-structured data stream(s) are processable to identify a value one or more of the contextual data properties 672B from the event-structured data stream(s), and/or to derive a value for one or more of the contextual data properties 672B. In some embodiments, the values for the contextual data properties 672B are generated and/or otherwise determined utilizing a specially configured event processing pipeline, as described herein.

In some embodiments, the event information includes one or more particular data values in a standard format. For example, in some embodiments, each event type is associated with event information including an event identifier, a start time, an end time, and an event payload embodying the content for the event. In some embodiments, the event metadata information 654A, for example, is associated with each event type, such that event metadata information 654A is received for each event represented in event-structured stream data.

Example Processes of the Disclosure

Having described example systems, apparatuses, computing environments, user interfaces, and data flows, example processes in accordance with the present disclosure will now be described. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sun-process of a second process. Additionally or alternative, any of the processes may include some or all of the steps described and/or depicted, including one or more optional operational blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 illustrates a flowchart including example operations of an example process for providing event-based observability functionality in accordance with at least one example embodiment of the present disclosure. Specifically, FIG. 7 depicts an example process 700 for specifically for managing event-structured observability data in a federated network and database platform. In some embodiments, the process 700 is embodied by computer program code stored on a non-transitory computer-readable medium of a computer program product configured for execution to perform the computer-implemented process described. Alternatively or additionally, in some embodiments, the process 700 is performed by one or more specially configured computing devices, such as the event-structured observability apparatus 200 communication with one or more external devices. In this regard, in some such embodiments, the event-structured observability apparatus 200 is specially configured by computer program instructions stored thereon, for example in the memory 204 and/or another component depicted and/or described herein, and/or otherwise accessible to the event-structured observability apparatus 200, for performing the operations depicted and described. In some embodiments, the specially configured event-structured observability apparatus 200 is in communication with one or more external apparatus(es), system(s), device(s), and/or the like, to perform one or more of the operations as depicted and described. For purposes of description, the process 700 is described with respect to performance by the event-structured observability apparatus 200.

The process 700 begins at operation 702. At operation 702, the event-structured observability apparatus 200 includes means, such as the event processing circuitry 210, communications circuitry 208, input/output circuitry 206, memory 204, processor 202, and/or the like, to receive a data stream representing operational engagement of an event-structured service hosted by the federated network and database platform. In some embodiments, for example, the operational engagement corresponds to interactions automatically initiated interactions associated with the event-structured service and/or user interactions associated with the event-structured service. Alternatively or additionally, in some embodiments, the data stream represents operational engagement of the event-structured service with another event-structured service and/or other component of the federated network and database platform (e.g., one or more inter-service requests, database requests, and/or the like). As described herein, in some embodiments, an data stream is received utilizing one or more event-structured observability client libraries configured to enable collection and/or receiving of the data stream in response to operational engagement of the event-structured service. For example, in some embodiments, an event-structured observability client library is integrated into the event-structured service and/or an associated process to enable collection and/or other receiving of the data stream in response to operational engagement of the event-structured service.

In some embodiments, the data stream embodies a linked observable data elements stream. The linked observable data elements stream includes or otherwise embodies any number of linked observable data element(s) associated with at least one linking identifier. The at least one linking identifier may "link" such linked observable data elements as associated with one or more particular events. Additionally or alternatively, the linking identifier(s) may be utilized to retrieve and/or identify associated linked observable data elements, for example for retrieval and/or processing.

The linked observable data stream may include any number of data portions associated and/or otherwise linked with one another via one or more linking identifier(s). For example, in some embodiments, the linked observable data stream includes one or more portions of metric data, one or more portions of log data, and/or one or more portions of trace data. Each of these individual data portions include or be associated with one or more linking identifiers that link such data portions, for example one or more span identifier(s). The span identifier(s) may, for example, have been generated by and/or propagated by different event-structured service(s) that performed one or more interactions as part of a particular event. For example, the linking identifiers may be injected into observable data elements by specially configured event-structured client libraries accessible to the event-structured service(s). It should be appreciated that linked observable data stream may include data portions associated with a single event, or may include data portions associated with multiple events.

At optional operation 704, the event-structured observability apparatus 200 includes means, such as the event processing circuitry 210, communications circuitry 208, input/output circuitry 206, memory 204, processor 202, and/or the like, to generate, utilizing an event-processing pipeline, event-structured observability data from the data stream. In some embodiments, the event-structured observability data is aggregated, filtered, transformed, and/or routed version(s) and/or portion(s) of the data stream. In this regard, the event-structured observability data may be modified and/or routed for storing in one or more data repositories. Alternatively or additionally, the event-structured observability data may be routed for processing associated with one or more event-based observability action(s) as described herein. In some embodiments, the event-structured observability data embodies extracted or identified data portions of the data stream, for example individual linked observable data element(s) and/or portions thereof in a linked observable data elements stream, or data portions of an event-structured data stream.

At operation 706, the event-structured observability apparatus 200 includes means, such as the event processing circuitry 210, communications circuitry 208, input/output circuitry 206, memory 204, processor 202, and/or the like, to store the event-structured observability data in at least one event-structured observability data repository of the federated network and database platform. In some embodiments, the event-structured observability data is stored in particular event-structured observability data repository/repositories based on the operational engagement represented by the data stream, the event-structured observability data generated therefrom (and/or events thereof), and/or the like. For example, in some embodiments, the event-structured observability data is stored in one or more event-structured observability data repository/repositories based on the event types represented by the event-structured observability data.

In yet some other embodiments, at least a first portion of the event-structured observability data is stored in a first event-structured observability data repository and a second portion of the event-structured observability data is stored in a second event-structured observability data repository. For example, a first portion of event-structured observability data identified for use in one or more real-time event-driven observability actions may be stored in a first event-structured observability data repository that enables rapid retrieval of such data (e.g., low cardinality data), while a second portion of event-structured observability data identified for use in detailed user querying for observability data (e.g., high cardinality data) may be stored in a second event-structured observability data repository that minimizes the cost and/or operational latency associated with storage and/or retrieval of such data.

In some embodiments, for example, various portions of a linked observable data elements stream are stored in different event-structured observability data repository. For example, a first type of linked observable data elements may be stored in a first event-structured observability data repository and a second type of linked observable data elements may be stored in a second event-structured observability data repository. Alternatively or additionally, processed linked observable data elements (e.g., aggregated versions of such data) may be stored in a first event-structured observability data repository and unprocessed, raw data values embodying such linked observable data element(s) may be stored in a second event-structured observability data repository.

At operation 708, the event-structured observability apparatus 200 includes means, such as the event processing circuitry 210, communications circuitry 208, input/output circuitry 206, memory 204, processor 202, and/or the like, to initiate an event-driven observability action based on the event-structured observability data. In some embodiments, the event-structured observability apparatus 200 executes the event-driven observability action and/or causes rendering of information associated therewith or resulting from the event-driven observability action. Alternatively or additionally, in some embodiments, the event-structured observability apparatus 200 initiates the event-driven observability action by transmitting one or more requests to a separate platform, system, service, and/or the like, that executes the event-driven observability action and provides the results. Non-limiting examples of operations embodying initiation of an event-driven observability action are described herein with respect to FIGS. 9, 10, and 11.

In some embodiments, the event-structured observability data utilized in initiating one or more event-driven observability actions embodies particular linked observable data elements corresponding to one or more events. For example, associated linked observable data elements representing aspects of a particular event may be processed to provide particular insights associated with the event. In some such embodiments, the event-structured observability data embodying such linked observable data elements may be retrieved from the one or more event-structured observability data repositories by querying for particular linking identifier(s) corresponding to the event(s). The linking identifier associated with retrieving linked observable data elements for one or more event-driven observability action(s) may be identified automatically by the event-structured observability apparatus and/or by user input associated with request(s) to initiate particular event-driven observability action(s) and/or queries for observability data.

FIG. 8 illustrates a flowchart including example additional operations of another example process for providing event-based observability functionality in accordance with at least one example embodiment of the present disclosure. Specifically, FIG. 8 depicts an example process 800 for generating and/or storing event-structured observability data for storing in a particular event-structured observability data repository. In some embodiments, the process 800 is embodied by computer program code stored on a non-transitory computer-readable medium of a computer program product configured for execution to perform the computer-implemented process described. Alternatively or additionally, in some embodiments, the process 800 is performed by one or more specially configured computing devices, such as the event-structured observability apparatus 200 communication with one or more external devices. In this regard, in some such embodiments, the event-structured observability apparatus 200 is specially configured by computer program instructions stored thereon, for example in the memory 204 and/or another component depicted and/or described herein, and/or otherwise accessible to the event-structured observability apparatus 200, for performing the operations depicted and described. In some embodiments, the specially configured event-structured observability apparatus 200 is in communication with one or more external apparatus(es), system(s), device(s), and/or the like, to perform one or more of the operations as depicted and described. For purposes of description, the process 800 is described with respect to performance by the event-structured observability apparatus 200.

The process 800 begins at operation 802. In some embodiments, the process 800 begins after one or more operations of another process, such as the operation 702 of the process 700 as depicted and described. Additionally or alternatively, in some embodiments, upon completion of the process 800 flow proceeds to one or more operations of another process, such as the operation 706 of the process 700 as depicted and described. In other embodiments, the flow ends upon completion of the process 800.

At operation 802, the event-structured observability apparatus 200 includes means, such as the event processing circuitry 210, communications circuitry 208, input/output circuitry 206, memory 204, processor 202, and/or the like, to identify a particular event-structured observability data repository to store the event-structured observability data. In some embodiments, the event-structured observability apparatus 200 identifies the particular event-structured observability data repository based on one or more of the data stream(s) processed to generate the event-structured observability data and/or one or more data values associated with or embodied by the event-structured observability data. For example, in some embodiments, the particular event-structured observability data repository is identified based on the interaction resulting in the data stream utilized to generate the event-structured observability data. Alternatively or additionally, in some embodiments, the particular event-structured observability data repository event-structured observability data is identified based on one or more event(s) embodied by the event-structured observability data. For example, in some embodiments, event-structured observability data embodying a first event is stored in a particular corresponding event-structured observability data repository, and event-structured observability data embodying a second event is stored in a different particular corresponding event-structured observability data repository.

At operation 804, the event-structured observability apparatus 200 includes means, such as the event processing circuitry 210, communications circuitry 208, input/output circuitry 206, memory 204, processor 202, and/or the like, to generate the event-structured observability data from the data stream in a repository-based structured format associated with the particular event-structured observability data repository. The repository-based structured format in some embodiments defines how such event-structured observability data is to be stored to enable retrieval and/or to enhance storage and/or retrieval efficiency associated with such event-structured observability data. In some embodiments, for example, the event-structured observability apparatus 200 is configured to determine the repository-based structured format associated with the particular event-structured observability data repository. In other embodiments, for example, the event-structured observability apparatus 200 is configured such that the repository-based structured format associated with the particular event-structured observability data repository is predetermined. The event-structured observability data may otherwise be generated based on the data stream as described with respect to operation 704.

In some embodiments, the repository-based structured formats are utilized to meet the requirements of event-structured data repositories specially configured to consume and process data in that particular format. For example, a Lightstep implementation may be specially configured to receive and process trace data to provide dashboard and/or other analytical tools to extract meaningful information from the traces. Similarly, a SignalFx implementation may be specially configured to receive and process metric data to provide dashboard and/or other analytical tools that extract meaningful information from the metrics. Formatting one or more portion(s) of data to a repository-based structured format enables such independent implementations to accurately process the information for the particular uses of that implementation.

FIG. 9 illustrates a flowchart including example additional operations of another example process for providing event-based observability functionality in accordance with at least one example embodiment of the present disclosure. Specifically, FIG. 9 depicts an example process 900 for initiating an event-driven observability action including rendering of an observability event dashboard. In some embodiments, the process 900 is embodied by computer program code stored on a non-transitory computer-readable medium of a computer program product configured for execution to perform the computer-implemented process described. Alternatively or additionally, in some embodiments, the process 900 is performed by one or more specially configured computing devices, such as the event-structured observability apparatus 200 communication with one or more external devices. In this regard, in some such embodiments, the event-structured observability apparatus 200 is specially configured by computer program instructions stored thereon, for example in the memory 204 and/or another component depicted and/or described herein, and/or otherwise accessible to the event-structured observability apparatus 200, for performing the operations depicted and described. In some embodiments, the specially configured event-structured observability apparatus 200 is in communication with one or more external apparatus(es), system(s), device(s), and/or the like, to perform one or more of the operations as depicted and described. For purposes of description, the process 900 is described with respect to performance by the event-structured observability apparatus 200.

The process 900 begins at operation 902. In some embodiments, the process 900 begins after one or more operations of another process, such as the operation 706 of the process 700 as depicted and described. Additionally or alternatively, in some embodiments, upon completion of the process 900 flow proceeds to one or more operations of another process, such as the operation 708 of the process 700 as depicted and described. In other embodiments, the flow ends upon completion of the process 900.

At operation 902, the event-structured observability apparatus 200 includes means, such as the event processing circuitry 210, communications circuitry 208, input/output circuitry 206, memory 204, processor 202, and/or the like, to cause rendering of an observability event dashboard. The observability event dashboard comprises at least a portion of the event-structured observability data generated as described. In some embodiments, the apparatus 200 causes rendering of the observability event dashboard to a client device connected to the event-structured observability apparatus 200, for example with which an authenticated session associated with a particular user account corresponding to one or more event-structured services is initiated. In some such embodiments, the event-structured observability apparatus 200 transmits one or more specially configured transmissions that causes rendering of the observability event dashboard to the client. Alternatively or additionally, in some embodiments, the event-structured observability apparatus 200 causes rendering of the observability event dashboard to a display of or associated with the event-structured observability apparatus 200.

The observability event dashboard may include some or all of the event-structured observability data. In this regard, the observability event dashboard enables viewing of such event-structured observability data by a user associated with the client device, for example for purposes of analyzing the operations of the corresponding event-structured service. In some embodiments, the observability event dashboard further comprises data derived from the event-structured observability data. For example, in some embodiments, the observability event dashboard includes one or more detected data error(s) and/or service problem(s), a root cause identified for such data error(s) and/or service problem(s), a predicted data error and/or service problem based on the event-structured observability data, and/or other data identified associated with any of a number of other event-driven observability actions as described herein.

In some embodiments, the observability event dashboard includes one or more insights associated with particular events. For example, the observability event dashboard may include particular insights derived from event-structured observability data embodying one or more portions of linked observable data elements. In some embodiments, such insights may be derived from linked observable data elements stored as event-structured observability data and associated with one or more shared linking identifier.

FIG. 10 illustrates a flowchart including example additional operations of another example process for providing event-based observability functionality in accordance with at least one example embodiment of the present disclosure. Specifically, FIG. 10 depicts an example process 1000 for initiating an event-driven observability action including identification of an event-driven observability alert. In some embodiments, the process 1000 is embodied by computer program code stored on a non-transitory computer-readable medium of a computer program product configured for execution to perform the computer-implemented process described. Alternatively or additionally, in some embodiments, the process 1000 is performed by one or more specially configured computing devices, such as the event-structured observability apparatus 200 communication with one or more external devices. In this regard, in some such embodiments, the event-structured observability apparatus 200 is specially configured by computer program instructions stored thereon, for example in the memory 204 and/or another component depicted and/or described herein, and/or otherwise accessible to the event-structured observability apparatus 200, for performing the operations depicted and described. In some embodiments, the specially configured event-structured observability apparatus 200 is in communication with one or more external apparatus(es), system(s), device(s), and/or the like, to perform one or more of the operations as depicted and described. For purposes of description, the process 1000 is described with respect to performance by the event-structured observability apparatus 200.

The process 1000 begins at operation 1002. In some embodiments, the process 1000 begins after one or more operations of another process, such as the operation 706 of the process 700 as depicted and described. Additionally or alternatively, in some embodiments, upon completion of the process 1000 flow proceeds to one or more operations of another process, such as the operation 708 of the process 700 as depicted and described. In other embodiments, the flow ends upon completion of the process 1000.

At operation 1002, the event-structured observability apparatus 200 includes means, such as the event processing circuitry 210, communications circuitry 208, input/output circuitry 206, memory 204, processor 202, and/or the like, to identify, based on at least the event-structured observability data, an event-driven observability alert. In some embodiments, the event-driven observability alert embodies information identifying a detected data error and/or service problem associated with the event-structured observability data. Alternatively or additionally, in some embodiments, the event-driven observability alert embodies information identifying a predicted data error and/or service problem associated with the event-structured service associated with the event-structured observability data. Alternatively or additionally, in some embodiments, the event-driven observability alert embodies information identifying a root cause of a detected and/or predicted data error and/or service problem associated with the event-structured service associated with the event-structured observability data. Alternatively or additionally, in some embodiments, the event-driven observability alert includes any other information for alerting the user to a data error and/or service problem (e.g., high latency, connection errors, and/or the like) associated with an event-structured service and/or a portion thereof. For example, in some embodiments, an event-driven observability alert is associated with a particular version of an event-structured service, and/or corresponding user-facing application, and/or an identified and/or triaged portion of the event-structured service determined to be experiencing the data error and/or service problem.

At optional operation 1004, the event-structured observability apparatus 200 includes means, such as the event processing circuitry 210, communications circuitry 208, input/output circuitry 206, memory 204, processor 202, and/or the like, to provide the event-driven observability alert to a client. In some embodiments, for example, the event-structured observability apparatus 200 configures a specially configured transmission to the client that includes or otherwise represents the event-driven observability alert. Alternatively or additionally, in some embodiments, the event-structured observability apparatus 200 provides the event-driven observability alert as part of an event-structured event dashboard as described herein. In some other embodiments, additionally or alternatively, the event-driven observability alert is further processed, for example to triage a data error and/or service problem identified based on the event-structured observability data.

In some embodiments, the event-driven observability alert is provided via a notification routing system. The event-structured observability apparatus 200 may provide the event-driven observability alert to the notification routing system to cause the notification routing system to forward the event-driven observability alert to one or more users. For example, in some embodiments where the event-structured observability alert is associated with a particular event-structured service, the notification routing system may identify particular users to be notified associated with the event-structured service and transmit the event-structured observability alert to computing device(s) associated with such users. A non-limiting example of a notification routing system comprises OpsGenie™ by Atlassian, Inc.

FIG. 11 illustrates a flowchart including example additional operations of another example process for providing event-based observability functionality in accordance with at least one example embodiment of the present disclosure. Specifically, FIG. 11 depicts an example process 1100 for initiating an event-driven observability action including executing a user query for observability data. In some embodiments, the process 1100 is embodied by computer program code stored on a non-transitory computer-readable medium of a computer program product configured for execution to perform the computer-implemented process described. Alternatively or additionally, in some embodiments, the process 1100 is performed by one or more specially configured computing devices, such as the event-structured observability apparatus 200 communication with one or more external devices. In this regard, in some such embodiments, the event-structured observability apparatus

200 is specially configured by computer program instructions stored thereon, for example in the memory 204 and/or another component depicted and/or described herein, and/or otherwise accessible to the event-structured observability apparatus 200, for performing the operations depicted and described. In some embodiments, the specially configured event-structured observability apparatus 200 is in communication with one or more external apparatus(es), system(s), device(s), and/or the like, to perform one or more of the operations as depicted and described. For purposes of description, the process 1100 is described with respect to performance by the event-structured observability apparatus 200.

The process 1100 begins at operation 1102. In some embodiments, the process 1100 begins after one or more operations of another process, such as the operation 706 of the process 700 as depicted and described. Additionally or alternatively, in some embodiments, upon completion of the process 1100 flow proceeds to one or more operations of another process, such as the operation 708 of the process 700 as depicted and described. In other embodiments, the flow ends upon completion of the process 1100.

At operation 1102, the event-structured observability apparatus 200 includes means, such as the event processing circuitry 210, communications circuitry 208, input/output circuitry 206, memory 204, processor 202, and/or the like, to receive a user query for observability data. In some embodiments, the user query for observability data is received from a client associated with the event-structured service associated with the event-structured observability data. Alternatively or additionally, in some embodiments, a user provides the user query for observability data based on one or more aspects of the stored event-structured observability data that the user would like to explore for purposes of analyzing operations of the event-structured service. It should be appreciated that, because the event-structured observability data stored associated with a particular event-structured service is configured to include or otherwise embody all contextual data determined to be useful for analyzing the operations of the event-structured service at various levels of granularity, the user may generate a user query for observability data that slices the relevant data based on any desired perspective and/or level of analysis. Similarly, at least some event-structured observability data is configured for storing over a significant timestamp interval as compared to conventional observability data (e.g., months for example), such that the user may generate a user query for observability data that targets particular slices of the event-structured observability data over any portion of the timestamp interval for which the event-structured observability data has been stored.

In some embodiments, the user query for observability data is associated with particular event(s) identifiable from one or more linking identifiers. In this regard, event-structured observability data embodying one or more linked observable data elements associated with such linking identifier(s) may be retrieved by querying one or more event-structured data repositories for such linking identifiers.

At operation 1104, the event-structured observability apparatus 200 includes means, such as the event processing circuitry 210, communications circuitry 208, input/output circuitry 206, memory 204, processor 202, and/or the like, to provide at least the event-structured observability data in response to the user query for observability data. In some such embodiments, the event-structured observability apparatus 200 executes the user query for observability data. For example, in some embodiments, the user query for observability data is executed via at least one event-structured observability data repository, such that event-structured observability data that meets the parameters of the query for the observability data is retrieved. In other embodiments, multiple event-structured observability data repositories are queried based on the user query for observability data. As described, the query may be constructed with respect to any of a myriad of parameters and/or slices of parameters associated with different event(s) and/or event type(s) embodied by stored event-structured observability data. In some such embodiments, the event-structured observability apparatus 200 identifies particular event-structured observability data repository/repositories to query based on the user query for observability data and/or parameters thereof. In some embodiments, the event-structured observability apparatus 200 provides the at least the event-structured observability data in response to the user query for observability data upon retrieving the event-structured observability data from one or more event-structured observability data repositories.

As described, in some embodiments, the event-structured observability apparatus 200 provides at least the event-structured observability data to a client. For example, in some embodiments, the event-structured observability apparatus 200 provides at least the event-structured observability data for rendering via an observability dashboard interface comprising at least the results of the user query for observability data. In some such embodiments, the event-structured observability apparatus 200 provides at least the event-structured observability data by transmitting at least one specially configured transmission and/or response including or otherwise representing the results of the user query for observability data for rendering and/or further processing. Alternatively or additionally, in some embodiments, the event-structured observability apparatus 200 provides at least the event-structured observability data for rendering via a display of the event-structured observability apparatus 200.

FIG. 12 illustrates a flowchart including example additional operations of another example process for providing event-based observability functionality in accordance with at least one example embodiment of the present disclosure. Specifically, FIG. 12 depicts an example process 1200 for receiving at least one data stream representing operational engagement with an event-structured service. In some embodiments, the process 1200 is embodied by computer program code stored on a non-transitory computer-readable medium of a computer program product configured for execution to perform the computer-implemented process described. Alternatively or additionally, in some embodiments, the process 1200 is performed by one or more specially configured computing devices, such as the event-structured observability apparatus 200 communication with one or more external devices. In this regard, in some such embodiments, the event-structured observability apparatus 200 is specially configured by computer program instructions stored thereon, for example in the memory 204 and/or another component depicted and/or described herein, and/or otherwise accessible to the event-structured observability apparatus 200, for performing the operations depicted and described. In some embodiments, the specially configured event-structured observability apparatus 200 is in communication with one or more external apparatus(es), system(s), device(s), and/or the like, to perform one or more of the operations as depicted and described. For purposes of description, the process 1200 is described with respect to performance by the event-structured observability apparatus 200.

The process 1200 begins at operation 1202, 1204, and/or 1206. It should be appreciated that, in some embodiments, the process 1200 performs one or more of these operations simultaneously, in parallel, and/or serially, for example in circumstances where different data streams or portions thereof are received utilizing any of a myriad of mechanisms. In some embodiments, the process 1200 begins after one or more operations of another process, for example at the beginning of process 700. Additionally or alternatively, in some embodiments, upon completion of the process 1200 flow proceeds to one or more operations of another process, such as the operation 704 of the process 700 as depicted and described. In other embodiments, the flow ends upon completion of the process 1200.

At operation 1202, the event-structured observability apparatus 200 includes means, such as the event processing circuitry 210, communications circuitry 208, input/output circuitry 206, memory 204, processor 202, and/or the like, to receive an data stream from a client operationally engaging an event-structured service. In some embodiments, for example, the client executes a client-facing application configured to enable operational engagement of an event-structured service, for example by performing one or more interactions with the event-structured service and/or a related computing service. In some such embodiments, the user-facing application is configured to collect and/or identify, and/or subsequently provide, the data stream representing the operational engagement of the event-structured service in response to user interactions via the user-facing application. It should be appreciated that, in some embodiments, a portion of a data stream is received in this manner, and additional portion(s) are received as described with respect to operations 1204 and/or 1206.

Alternatively or additionally, at operation 1204, the event-structured observability apparatus 200 includes means, such as the event processing circuitry 210, communications circuitry 208, input/output circuitry 206, memory 204, processor 202, and/or the like, to receive a data stream from a sidecar observability process associated with the event-structured service. In some embodiments, for example, the sidecar observability process is a separate process and/or executed on a separate computing system that is configured to monitor operational engagement of the event-structured service. For example, the sidecar observability process may be separate from a primary process providing functionality associated with the event-structured service, and configured to monitor interactions automatically initiated by the event-structured service, an associated event-structured service, and/or initiated by a user associated with the event-structured service. In some such embodiments, the sidecar process may additionally collect and/or process other data streams that exist in proximity to an instance of the event-structured service, for example by collecting data associated with the virtual and/or physical hardware that an event-structured service and/or the sidecar process is/are executing on.

It should be appreciated that the sidecar observability process may, as described herein, be executed via the same or different computing hardware as the primary process associated with the event-structured service, and embodied in a different runtime environment configured to monitor the runtime environment within which the primary process of the event-structured service is initiated. It should be appreciated that, in some embodiments, a portion of a data stream is received in this manner, and additional portion(s) are received as described with respect to operations 1202 and/or 1206.

Alternatively or additionally, at operation 1206, the event-structured observability apparatus 200 includes means, such as the event processing circuitry 210, communications circuitry 208, input/output circuitry 206, memory 204, processor 202, and/or the like, to receive a data stream from an event-structured service. In this regard, a primary process of the event-structured service provides the data stream in response to operational engagement of the event-structured service. In this regard, some such event-structured services may be configured such that use of a sidecar observability process is not needed. For example, in some such embodiments, an event-structured service may integrate at least one event-structured observability client library that collects and/or otherwise identifies data associated with operation engagement of the event-structured service for providing within the data stream. In this regard, for example, the event-structured observability client library may provide such a data stream upon termination of the operational engagement, in real-time, and/or the like.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for managing event-structured observability data in a federated network and database platform, the event-structured observability data generated via first operational engagement of a first event-structured service and second operational engagement of a second event-structured service, the apparatus comprising at least one processor and at least one non-transitory memory, the at least one non-transitory memory having computer-coded instructions stored thereon that, in execution with the at least one processor, configures the apparatus to:
receive a linked observable data elements stream representing operational engagement of the second event-structured service hosted by the federated network and database platform, the linked observable data elements stream including a plurality of linked observable data elements associated with at least one linking identifier, the plurality of linked observable data elements comprising at least linked metrics data associated with the at least one linking identifier, linked logs data associated with the at least one linking identifier, and linked trace data associated with the at least one linking identifier, and wherein the at least one linked identifier comprises a sub-linking identifier generated by the first operational engagement of the first event-structured service and propagated to the second event-structured service in association with the second operational engagement of the second event-structured service;
store event-structured observability data based on the linked observable data elements stream in at least one event-structured observability data repository of the federated network and database platform; and
initiate an event-driven observability action based on the event-structured observability data, wherein to initiate the event-driven observability action, the apparatus is configured to:
receive a user query for observability data; and
provide at least the portion of the linked observable data elements stream in response to the user query for observability data.

2. The apparatus according to claim 1, wherein the at least one linking identifier comprises at least a first linking identifier associated with a first data-driven interaction by the first event-structured service and the at least one linking identifier comprises at least a second linking identifier associated with a second data-driven interaction by the second event-structured service, the second data-driven interaction initiated via the first event-structured service.

3. The apparatus according to claim 1, wherein to initiate the event-driven observability action, the apparatus is configured to:
cause rendering of an observability event dashboard comprising at least a portion of the event-structured observability data.

4. The apparatus according to claim 1, wherein to initiate the event-driven observability action, the apparatus is configured to:
identify, based on at least the event-structured observability data, an event-driven observability alert; and
provide the event-driven observability alert to a client.

5. The apparatus according to claim 1, wherein to receive the linked observable data elements stream the apparatus is configured to:
receive at least a first portion of the linked observable data elements stream from a sidecar observability process.

6. The apparatus according to claim 1, wherein the at least one event-structured observability data repository is determined based on a data type associated with a portion of the linked observable data elements stream indicating the linked observable data elements stream comprises metrics data, logs data, or trace data.

7. The apparatus according to claim 1, the apparatus further configured to:
generate the linked observable data elements stream by injecting the at least one linking identifier into at least one observable data element.

8. The apparatus according to claim 1, wherein the event-driven observability action is initiated in real-time.

9. The apparatus according to claim 1, wherein the event-driven observability action is initiated after a real-time period.

10. A computer-implemented method for managing event-structured observability data in a federated network and database platform, the event-structured observability data generated via first operational engagement of a first event-structured service and second operational engagement of a second event-structured service, the computer-implemented method comprising:
receiving a linked observable data elements stream representing operational engagement of a second event-structured service hosted by the federated network and database platform, the linked observable data elements stream including a plurality of linked observable data elements associated with at least one linking identifier, the plurality of linked observable data elements comprising at least linked metrics data associated with the at least one linking identifier, linked logs data associated with the at least one linking identifier, and wherein the at least one linked identifier comprises a sub-linking identifier generated by the first operational engagement of the first event-structured service and propagated to the second event-structured service in association with the second operational engagement of the second event-structured service;
storing event-structured observability data based on the linked observable data elements stream in at least one event-structured observability data repository of the federated network and database platform; and
initiating an event-driven observability action based on the event-structured observability data, wherein initiating the event-driven observability action comprises:
receiving a user query for observability data; and
providing at least the portion of the linked observable data elements stream in response to the user query for observability data.

11. The computer-implemented method according to claim 10, wherein the at least one linking identifier comprises at least a first linking identifier associated with a first data-driven interaction by the first event-structured service and the at least one linking identifier comprises at least a second linking identifier associated with a second data-driven interaction by the second event-structured service, the second data-driven interaction initiated via the first event-structured service.

12. The computer-implemented method according to claim 10, wherein initiating the event-driven observability action comprises:
  causing rendering of an observability event dashboard comprising at least a portion of the event-structured observability data.

13. The computer-implemented method according to claim 10, wherein initiating the event-driven observability action comprises:
  identifying, based on at least the event-structured observability data, an event-driven observability alert; and
  providing the event-driven observability alert to a client.

14. The computer-implemented method according to claim 10, wherein the at least one event-structured observability data repository is determined based on a data type associated with a portion of the linked observable data elements stream indicating the linked observable data elements stream comprises metrics data, logs data, or trace data.

15. The computer-implemented method according to claim 10, the computer-implemented method further comprising:
  generating the linked observable data elements stream by injecting the at least one linking identifier into at least one observable data element.

16. A computer program product for managing event-structured observability data in a federated network and database platform, the event-structured observability data generated via first operational engagement of a first event-structured service and second operational engagement of a second event-structured service, the computer program product comprising at least one non-transitory computer-readable storage medium having computer program code stored thereon, the computer program product, in execution with at least one processor, configured for:
  receiving a linked observable data elements stream representing operational engagement of a second event-structured service hosted by the federated network and database platform, the linked observable data elements stream including a plurality of linked observable data elements associated with at least one linking identifier, the plurality of linked observable data elements comprising at least linked metrics data associated with the at least one linking identifier, linked logs data associated with the at least one linking identifier, and linked trace data associated with the at least one linking identifier, and wherein the at least one linked identifier comprises a sub-linking identifier generated by the first operational engagement of the first event-structured service and propagated to the second event-structured service in association with the second operational engagement of the second event-structured service;
  storing event-structured observability data based on the linked observable data elements stream in at least one event-structured observability data repository of the federated network and database platform; and
  initiating an event-driven observability action based on the event-structured observability data, wherein initiating the event-driven observability action comprises:
    receiving a user query for observability data; and
    providing at least the portion of the linked observable data elements stream in response to the user query for observability data.

17. The computer program product according to claim 16, the computer program product further configured for:
  generating the linked observable data elements stream by injecting the at least one linking identifier into at least one observable data element.

18. The apparatus according to claim 1, wherein the plurality of linked observable data elements are associated with one or more event payloads.

* * * * *